United States Patent
Stivender

(10) Patent No.: US 8,038,915 B2
(45) Date of Patent: Oct. 18, 2011

(54) PANEL SMOOTHING PROCESS AND APPARATUS FOR FORMING A SMOOTH CONTINUOUS SURFACE ON FIBER-REINFORCED STRUCTURAL CEMENT PANELS

(75) Inventor: Eugene Scott Stivender, Elkhorn, WI (US)

(73) Assignee: United States Gypsum Company, Chicago, IL (US)

( * ) Notice: Subject to any disclaimer, the term of this patent is extended or adjusted under 35 U.S.C. 154(b) by 0 days.

(21) Appl. No.: 12/684,638

(22) Filed: Jan. 8, 2010

(65) Prior Publication Data

US 2010/0132870 A1    Jun. 3, 2010

Related U.S. Application Data

(62) Division of application No. 11/555,661, filed on Nov. 1, 2006, now abandoned.

(51) Int. Cl.
*B28B 1/08*    (2006.01)
*B32B 3/18*    (2006.01)
*B32B 13/02*    (2006.01)

(52) U.S. Cl. .............. 264/70; 264/69; 264/333; 156/42; 156/45; 156/347

(58) Field of Classification Search ............. 156/42, 156/45, 39, 279, 346, 347, 348; 264/70; 425/456; 428/294.7
See application file for complete search history.

(56) References Cited

U.S. PATENT DOCUMENTS

| | | | |
|---|---|---|---|
| 1,476,938 A * | 12/1923 | Walper | 264/212 |
| 1,556,164 A | 10/1925 | Schumacher | |
| 1,578,250 A | 3/1926 | Armstrong | |
| 1,702,730 A | 2/1929 | Hite | |
| 1,945,306 A | 1/1934 | Dean | |

(Continued)

FOREIGN PATENT DOCUMENTS

CA    1 121 804    4/1982

(Continued)

OTHER PUBLICATIONS

Shah, Ludirdja, Daniel and Mobasher; Toughness-Durability of Glass-Fiber Reinforced Concrete Systems; ACI Materials Journal, Sep.-Oct. 1988; pp. 352-360.

(Continued)

*Primary Examiner* — Philip Tucker
*Assistant Examiner* — William Bell
(74) *Attorney, Agent, or Firm* — Novak Druce + Quigg, LLP; Philip T. Petti; David F. Janci

(57) ABSTRACT

A vibrating flexible smoothing sheet or shroud disposed transversely of a direction of travel of a formed fiber panel including gypsum-cementitious slurry and embedded chopped fibers. The sheet is used to smooth the surface of the panel as it exits a fiber embedment station of a structural cementitious panel production line to remove grooves and other non-uniform surface imperfections to reduce the need for costly finishing after the panels are cured and cut to size. The flexible sheet is designed to float over the surface of the formed panel without tearing or otherwise damaging the surface of the heavily fiber reinforced surface layers of the panel. The vibrating sheet is pivotally mounted on the side dams of the web production line so it can float over the panel surface during use, but be raised off the line when not in use.

20 Claims, 9 Drawing Sheets

U.S. PATENT DOCUMENTS

| | | |
|---|---|---|
| 2,088,813 A | 8/1937 | Roos |
| 1,776,325 A | 9/1939 | Robinson et al. |
| 2,213,442 A | 9/1940 | Elliott |
| 2,276,237 A | 3/1942 | Lowry |
| 2,366,673 A | 1/1945 | Paley |
| 2,743,909 A | 5/1956 | Lawlor |
| 2,805,051 A | 9/1957 | Miller |
| 2,985,219 A | 5/1961 | Summerfield |
| 3,343,818 A | 9/1967 | Plemons et al. |
| 3,423,492 A * | 1/1969 | Jonel et al. ............... 264/70 |
| 3,459,620 A | 8/1969 | McCleary et al. |
| 3,559,229 A | 2/1971 | De Noyer |
| 3,578,517 A | 5/1971 | Lapp et al. |
| 3,582,465 A | 6/1971 | Salomon |
| 3,626,486 A | 12/1971 | Bugbee et al. |
| 3,957,407 A | 5/1976 | Gault |
| 3,974,024 A | 8/1976 | Yano et al. |
| 4,057,443 A | 11/1977 | Stilling et al. |
| 4,084,013 A | 4/1978 | Mikkelson et al. |
| 4,090,827 A * | 5/1978 | Attwell ............... 425/64 |
| 4,105,383 A | 8/1978 | Hanson |
| 4,159,361 A | 6/1979 | Schupack |
| 4,187,130 A | 2/1980 | Kautz |
| 4,187,275 A | 2/1980 | Bracalielly et al. |
| 4,203,788 A | 5/1980 | Clear |
| 4,239,396 A | 12/1980 | Arribau et al. |
| 4,288,263 A | 9/1981 | Delcoigne et al. |
| 4,298,413 A | 11/1981 | Teare |
| 4,327,146 A | 4/1982 | White |
| 4,350,483 A | 9/1982 | Bonnet |
| 4,420,295 A | 12/1983 | Clear et al. |
| 4,420,299 A | 12/1983 | De Mets |
| 4,434,119 A | 2/1984 | Teare |
| 4,450,022 A | 5/1984 | Galer |
| 4,477,300 A | 10/1984 | Pilgrim |
| 4,488,917 A | 12/1984 | Porter et al. |
| 4,504,335 A | 3/1985 | Galer |
| RE32,037 E | 11/1985 | Clear |
| RE32,038 E | 11/1985 | Clear |
| 4,793,892 A | 12/1988 | Miller et al. |
| 4,816,091 A | 3/1989 | Miller |
| 4,847,022 A | 7/1989 | Bold |
| 5,002,620 A | 3/1991 | King |
| 5,221,386 A | 6/1993 | Ensminger et al. |
| 5,342,566 A | 8/1994 | Schafer |
| 5,350,554 A | 9/1994 | Miller |
| 5,352,035 A | 10/1994 | Macaulay et al. |
| 5,391,245 A | 2/1995 | Turner |
| 5,520,779 A * | 5/1996 | Bold ............... 162/181.3 |
| 5,570,953 A | 11/1996 | Dewall |
| 5,609,416 A | 3/1997 | Duckworth |
| 5,632,848 A | 5/1997 | Richards et al. |
| 5,643,510 A | 7/1997 | Sucech |
| 5,683,635 A | 11/1997 | Sucech et al. |
| 5,685,903 A | 11/1997 | Stav et al. |
| 5,714,001 A | 2/1998 | Savoly et al. |
| 5,714,032 A | 2/1998 | Ainsley et al. |
| 5,718,797 A | 2/1998 | Phillips et al. |
| 5,795,060 A | 8/1998 | Stephens |
| 5,854,426 A | 12/1998 | Benda |
| 5,858,083 A | 1/1999 | Stav et al. |
| 5,958,131 A | 9/1999 | Asbridge et al. |
| 6,176,920 B1 | 1/2001 | Murphy et al. |
| 6,187,409 B1 | 2/2001 | Mathieu |
| 6,190,476 B1 | 2/2001 | Seecharan et al. |
| 6,342,284 B1 | 1/2002 | Yu et al. |
| 6,357,905 B1 | 3/2002 | Birchard |
| 6,409,825 B1 | 6/2002 | Yu et al. |
| 6,416,695 B1 | 7/2002 | Miller |
| 6,443,258 B1 | 9/2002 | Putt et al. |
| 6,488,792 B2 | 12/2002 | Mathieu |
| 6,508,895 B2 | 1/2003 | Lynn et al. |
| 6,524,679 B2 | 2/2003 | Hauber et al. |
| 6,547,901 B1 | 4/2003 | Gerlich |
| 6,620,487 B1 | 9/2003 | Tonyan et al. |
| 6,774,146 B2 | 8/2004 | Savoly et al. |
| 6,866,492 B2 | 3/2005 | Hauber et al. |
| 6,874,930 B2 | 4/2005 | Wittbold et al. |
| 6,878,321 B2 | 4/2005 | Hauber et al. |
| 6,986,812 B2 * | 1/2006 | Dubey et al. ............... 118/259 |
| 2001/0000738 A1 | 5/2001 | Mathieu |
| 2002/0090871 A1 | 7/2002 | Ritchie et al. |
| 2002/0095893 A1* | 7/2002 | Walters et al. ............... 52/309.14 |
| 2003/0067836 A1 | 4/2003 | Fink, Jr. |
| 2004/0084127 A1 | 5/2004 | Porter |
| 2004/0134585 A1 | 7/2004 | Callais et al. |
| 2004/0142062 A1 | 7/2004 | Herrera |
| 2004/0218462 A1 | 11/2004 | Stephens |
| 2004/0231916 A1 | 11/2004 | Englert et al. |
| 2005/0024988 A1 | 2/2005 | Hoff et al. |
| 2005/0061237 A1 | 3/2005 | Dubey et al. |
| 2005/0064055 A1 | 3/2005 | Porter |
| 2005/0064164 A1 | 3/2005 | Dubey et al. |
| 2005/0121131 A1 | 6/2005 | Hennis et al. |
| 2005/0155689 A1 | 7/2005 | Smolenski |
| 2005/0219941 A1 | 10/2005 | Christenson et al. |
| 2006/0045975 A1 | 3/2006 | Yamaji et al. |
| 2006/0144005 A1 | 7/2006 | Tonyan et al. |
| 2006/0147681 A1 | 7/2006 | Dubey |
| 2006/0168906 A1 | 8/2006 | Tonyan et al. |
| 2006/0174572 A1 | 8/2006 | Tonyan et al. |
| 2006/0185267 A1 | 8/2006 | Tonyan et al. |
| 2006/0188674 A1 | 8/2006 | Fernette et al. |
| 2007/0110838 A1 | 5/2007 | Porter et al. |
| 2007/0110970 A1 | 5/2007 | Dubey |
| 2008/0099171 A1 | 5/2008 | Frank et al. |
| 2008/0101150 A1 | 5/2008 | George et al. |
| 2008/0101151 A1 | 5/2008 | Frank et al. |
| 2008/0110276 A1 | 5/2008 | Frank et al. |

FOREIGN PATENT DOCUMENTS

| | | |
|---|---|---|
| CN | 1448254 | 10/2003 |
| DE | 101 37 489 | 2/2003 |
| EP | 0 003 704 | 8/1979 |
| FR | 2 226 255 | 11/1974 |
| GB | 1 463 769 | 2/1977 |
| JP | 51-115523 | 10/1976 |
| WO | WO 9413443 | 6/1994 |
| WO | WO 9738858 | 10/1997 |
| WO | WO 02098646 | 12/2002 |

OTHER PUBLICATIONS

Mobasher and Shah; Test Parameters for Evaluating Toughness of Glass Reinforced Concrete Panels; ACI Materials Journal; Sep.-Oct. 1989, pp. 448-458.

USPTO Office action mailed Jul. 24, 2008 in co-pending U.S. Appl. No. 11/591,957 of Michael J. Porter, filed Nov. 1, 2006.

USPTO Office action mailed Aug. 18, 2008 in co-pending U.S. Appl. No. 11/555,658 of William A. Frank et al., filed Nov. 1, 2006.

USPTO Office Action of Aug. 12, 2008 for U.S. Appl. No. 10/555,655 of Lloyd George et al, filed Nov. 1, 2006.

USPTO Office Action mailed Sep. 29, 2009 in co-pending U.S. Appl. No. 11/555,647 of William Frank, filed Nov. 1, 2006.

USPTO Office Action mailed May 29, 2009 in co-pending U.S. Appl. No. 11/591,793 of Ashish Dubey, filed Nov. 1, 2006.

Definition of the term 'gate' [downloaded online from answers.com], downloaded on Sep. 21, 2009, definitions 1 and 2.

Notice of Allowance mailed Mar. 8, 2010 in corresponding U.S. Appl. No. 11/555,647.

* cited by examiner

US 8,038,915 B2

PANEL SMOOTHING PROCESS AND APPARATUS FOR FORMING A SMOOTH CONTINUOUS SURFACE ON FIBER-REINFORCED STRUCTURAL CEMENT PANELS

CROSS REFERENCE TO RELATED APPLICATIONS

This application is a Divisional of U.S. patent application Ser. No. 11/555,661, filed Nov. 1, 2006, now abandoned, incorporated herein by reference. This application is related to:

U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006, now U.S. Pat. No. 7,754,052, issued Jul. 13, 2010;

U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006, now U.S. Pat. No. 7,524,386, issued Apr. 28, 2009;

U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006, now U.S. Pat. No. 7,513,963, issued Apr. 27, 2009;

U.S. patent application Ser. No. 11/555,665, entitled WET SLURRY THICKNESS GAUGE AND METHOD FOR USE OF SAME, filed Nov. 1, 2006, now U.S. Pat. No. 7,475,599, issued Jan. 13, 2009;

U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006, now U.S. Pat. No. 7,670,520, issued Mar. 2, 2010; and U.S. patent application Ser. No. 11/591,957, entitled EMBEDMENT ROLL DEVICE, filed Nov. 1, 2006, now U.S. Pat. No. 7,513,768, issued Apr. 7, 2009;

all herein incorporated by reference in their entirety.

FIELD OF THE INVENTION

This invention relates to a continuous process and related apparatus for producing structural panels using settable slurry, and more specifically, to a smoothing device used in the manufacture of reinforced cementitious panels, referred to herein as structural cement panels (SCP), in which fibers are combined with quick-setting slurry for providing flexural strength.

BACKGROUND OF THE INVENTION

Cementitious panels have been used in the construction industry to form the interior and exterior walls of residential and/or commercial structures. The advantages of such panels include resistance to moisture compared to standard gypsum-based wallboard. However, a drawback of such conventional panels is that they do not have sufficient structural strength to the extent that such panels may be comparable to, if not stronger than, structural plywood or oriented strand board (OSB).

Typically, the cementitious panel includes at least one hardened cement composite layer between layers of a reinforcing or stabilizing material. In some instances, the reinforcing or stabilizing material is fiberglass mesh or the equivalent. The mesh is usually applied from a roll in sheet fashion upon or between layers of settable slurry. Examples of production techniques used in conventional cementitious panels are provided in U.S. Pat. Nos. 4,420,295; 4,504,335 and 6,176,920, the contents of which are incorporated by reference herein. Further, other gypsum-cement compositions are disclosed generally in U.S. Pat. Nos. 5,685,903; 5,858,083 and 5,958,131.

U.S. Pat. No. 6,620,487 to Tonyan, which is incorporated herein by reference in its entirety, discloses a reinforced, lightweight, dimensionally stable panel capable of resisting shear loads when fastened to framing equal to or exceeding shear loads provided by plywood or oriented strand board panels. The panels employ a core of a continuous phase resulting from the curing of an aqueous mixture of calcium sulfate alpha hemihydrate, hydraulic cement, an active pozzolan and lime, the continuous phase being reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the panels may include a cured continuous phase reinforced with glass fibers and containing sufficient polymer spheres to improve nailability or made with a water-to-reactive powders ratio to provide an effect similar to polymer spheres, or a combination thereof.

US Patent Application Publication No. 2005/0064055 to Porter, application Ser. No. 10/665,541, which is incorporated herein by reference in its entirety, discloses an embedment device for use in a structural panel production line wherein a slurry is transported on a moving carrier relative to a support frame, and chopped fibers are deposited upon the slurry, includes a first elongate shaft secured to the support frame and having a first plurality of axially spaced disks, a second elongate shaft secured to the support frame and having a second plurality of axially spaced disks, the first shaft being disposed relative to the second shaft so that the disks intermesh with each other. The intermeshing relationship enhances embedment of the fibers into the slurry and also prevents clogging of the device by prematurely set slurry particles.

US Patent Application Publication No. 2005/0064164 to Dubey et al., application Ser. No. 10/666,294, incorporated herein by reference in its entirety, discloses a multi-layer process for producing structural cementitious panel which includes: (a.) providing a moving web; (b.) one of (i) depositing a first layer of individual, loose fibers upon the web, followed by depositing a layer of settable slurry upon the web and (ii) depositing a layer of settable slurry upon the web; (c.) depositing a second layer of individual, loose fibers upon the slurry; (d.) actively embedding said second layer of individual, loose fibers into the slurry to distribute said fibers throughout the slurry; and (e.) repeating steps (ii) through (d.) until the desired number of layers of settable fiber-enhanced slurry is obtained and so that the fibers are distributed throughout the panel. Also provided are a structural panel produced by the process, an apparatus suitable for producing structural cementitious panels according to the process, and a structural cementitious panel having multiple layers, each layer created by depositing a layer of settable slurry upon a moving web, depositing fibers upon the slurry and embedding the fibers into the slurry such that each layer is integrally formed with the adjacent layers.

U.S. Pat. No. 6,986,812 of Dubey et al., incorporated herein by reference in its entirety, features a slurry feed apparatus for use in a SCP panel production line or the like application where settable slurries are used in the production of building panels or board. The apparatus includes a main metering roll and a companion roll placed in close, generally parallel relationship to each other to form a nip in which a supply of slurry is retained. Both rolls preferably rotate in the same direction so that slurry is drawn from the nip over the metering roll to be deposited upon a moving web of the SCP panel production line. A thickness control roll is provided in close operational proximity to the main metering roll for maintaining a desired thickness of the slurry.

U.S. Patent Application Publication No. 2006/0174572 to Tonyan et al., incorporated herein by reference in its entirety, discloses non-combustible SCP panel metal frame systems for shear walls.

There is a desire for an improved process and/or a related apparatus for producing fiber-reinforced cementitious panels which results in a board with structural properties comparable to structural plywood and OSB which reduces production line downtime. There is also a desire for a process and/or a related apparatus for producing such structural cementitious panels which more efficiently uses component materials to reduce production costs over conventional production processes. In particular there is a desire to produce a smooth SCP panel to minimize downstream sanding.

Furthermore, the above-described cementitious structural panels, also referred to as SCP panels, are preferably configured to behave in the construction environment similar to plywood and OSB. Thus, the SCP panels are preferably nailable and can be cut or worked using conventional saws and other conventional carpentry tools. Further, the SCP panels should meet building code standards for shear resistance, load capacity, water-induced expansion and resistance to combustion, as measured by recognized tests, such as ASTM E72, ASTM 661, ASTM C 1185 and ASTM E136 or equivalent, as applied to structural plywood sheets.

SUMMARY OF THE INVENTION

The present invention features a flexible smoothing device or shroud apparatus designed to apply a light uniform pressure to the entire top surface of a formed fiber reinforced gypsum-cement panel as it exits the embedment device of the final slurry forming station to smooth the surface of the panel and remove pock marks or grooves without damaging the panel.

The smoothing apparatus includes a mounting stand for pivotally mounting the apparatus on the side dams of the traveling web at a position after the web exits the final fiber embodiment station, a smooth flexible sheet, made for example of lightweight metal, which is relatively long and as wide as the formed gypsum-cement slurry panel. The smooth flexible sheet is disposed generally transversely to the direction of travel of the panel on the web. A stiffening member across the width of the sheet is mounted on the top surface of the sheet. Typically a vibrator is mounted on the on the top surface of the sheet for imparting vibration to the stiffening member which will cause the smoothing surface of the sheet to vibrate while in use.

For example, the vibrator may be mounted on the stiffening member to impart vibration to the entire surface in contact with the newly formed panel surface. The vibrating smoothing device has also been found to help embed the reinforcing fibers into the structured cement panels as the panels emerge from the embedment device of each of the forming stations.

Only the surface of a downstream end portion of the flexible sheet contacts the top surface of the formed panel and the flexible sheet of the smoothing device is curved so a small angle of entry, e.g., less than 15°, preferably less than 5°, is provided at the nip point and preferably the angle tapers to zero. This allows for a very gradual, or zero, change in the height of the SCP panel as it contacts the smoothing sheet.

The smoothing device with its pivoting mounting is designed to have the downstream end portion of the flexible sheet "float" up and down over the surface of the freshly formed gypsum-cement panel. Thus, only a low pre-determined pressure is exerted on the top surface to smooth out the surface and fill in grooves or pock marks in the panel surface. This avoids scratching or tearing the panel surface. Furthermore, the flexible sheet can be pivoted up and away from the panel production line when it is not in use. In addition to permitting it to be moved out of the way when not in use, the ability to pivot the flexible sheet up makes it easier to maintain and clean the device.

Typically the smoothing device is employed in a multi-layer process for producing structural cementitious panels (SCP's or SCP panels), and SCP's produced by such a process. After one of an initial deposition of loosely distributed, chopped fibers or a layer of slurry upon a moving web, fibers are deposited upon the slurry layer. An embedment device thoroughly mixes the recently deposited fibers into the slurry so that the fibers are distributed throughout the slurry, after which additional layers of slurry, then chopped fibers are added, followed by more embedment. The process is repeated for each layer of the panel, as desired. Upon completion, the board has a more evenly distributed fiber component, which results in relatively strong panels without the need for thick mats of reinforcing fibers, as are taught in prior art production techniques for cementitious panels.

In addition, the resulting panel is optionally provided with increased amount of fibers per slurry layer than in prior panels.

In a preferred embodiment, multiple layers of chopped individual loose fibers are deposited relative to each layer of deposited slurry. The preferred sequence is that a layer of loose fibers are deposited, upon either the moving web or existing slurry, followed by a layer of slurry, then another layer of fibers. Next, the fiber/slurry/fiber combination is subjected to embedding to thoroughly mix the fibers in the slurry. This procedure has been found to permit the incorporation and distribution of a relatively larger amount of slurry fibers throughout the slurry using fewer slurry layers. Thus, panel production equipment and processing time can be reduced, while providing an SCP panel with enhanced strength characteristics.

More specifically, the smoothing device may be employed in a process for producing structural cementitious panels made of at least one layer of fiber reinforced cementitious slurry, the process for each such layer of slurry including providing a moving web; depositing a first layer of individual, loose fibers upon the web; depositing a layer of settable slurry upon the deposited first layer of individual, loose fibers; depositing a second layer of individual, loose fibers upon the deposited layer of settable slurry; and actively embedding both layers of individual, loose fibers into the layer of slurry to distribute the fibers throughout the slurry.

In another embodiment, an apparatus for producing a multi-layered structural cementitious panel includes a conveyor-type frame supporting a moving web; a first loose fiber distribution station in operational relationship to the frame and is configured for depositing loose fibers upon the moving web; a first slurry feed station in operational relationship to the frame and configured for depositing a thin layer of settable slurry upon the moving web so that the fibers are covered. A second loose fiber distribution station is provided in operational relationship to the frame and is configured for depositing loose fibers upon the slurry. An embedment device is in operational relationship to the frame and is configured for generating a kneading action in the slurry to embed the fibers into the slurry and the smoothing device is downstream of at least one embedment device.

In yet another embodiment, a process is provided for making fiber-embedded cementitious panels, comprising:
using a first formula:

$$S_{f1,i}^P = \frac{4V_{f,i}t_i}{\pi(1+X_f)d_f}$$

for determining a projected fiber surface area fraction of a first fiber layer to be deposited in each settable slurry layer of the resulting panel;
using a second formula:

$$S_{f2,i}^P = \frac{4X_f V_{f,i}t_i}{\pi(1+X_f)d_f}$$

for determining a projected fiber surface area fraction of a second fiber layer to be deposited in each settable slurry layer of the resulting panel;
providing a desired slurry volume fraction $V_f$ of a percentage of the fibers in the fiber-reinforced slurry layer;
adjusting at least one of the fiber diameter $d_f$, and a fiber-reinforced slurry layer thickness $t_i$ in the range of 0.05-0.35 inches, and further apportioning the volume fraction $V_f$ of fibers into a proportion $X_f$ of the supply of fibers comparing the fibers in the second layer to the fibers in the first fiber layer so that the fiber surface area fraction $S_{f1,i}^P$ and the fiber surface area fraction $S_{f2,i}^P$ for each fiber layer is less than 0.65;
providing a supply of loose, individual fibers according to the above-calculated fiber surface area fraction $S_{f1,i}^P$;
providing a moving web;
depositing the first layer of loose, individual fibers upon the web;
depositing a layer of settable slurry upon the first layer of individual, loose fibers;
depositing the second layer of loose, individual fibers upon the layer of settable slurry;
embedding the loose, individual fibers in the slurry so that the multiple layers of fibers are distributed throughout each slurry layer in the panel; and
smoothing the panel with the smoothing device after at least one embedding step.

DETAILED DESCRIPTION OF THE INVENTION

Figure 1:
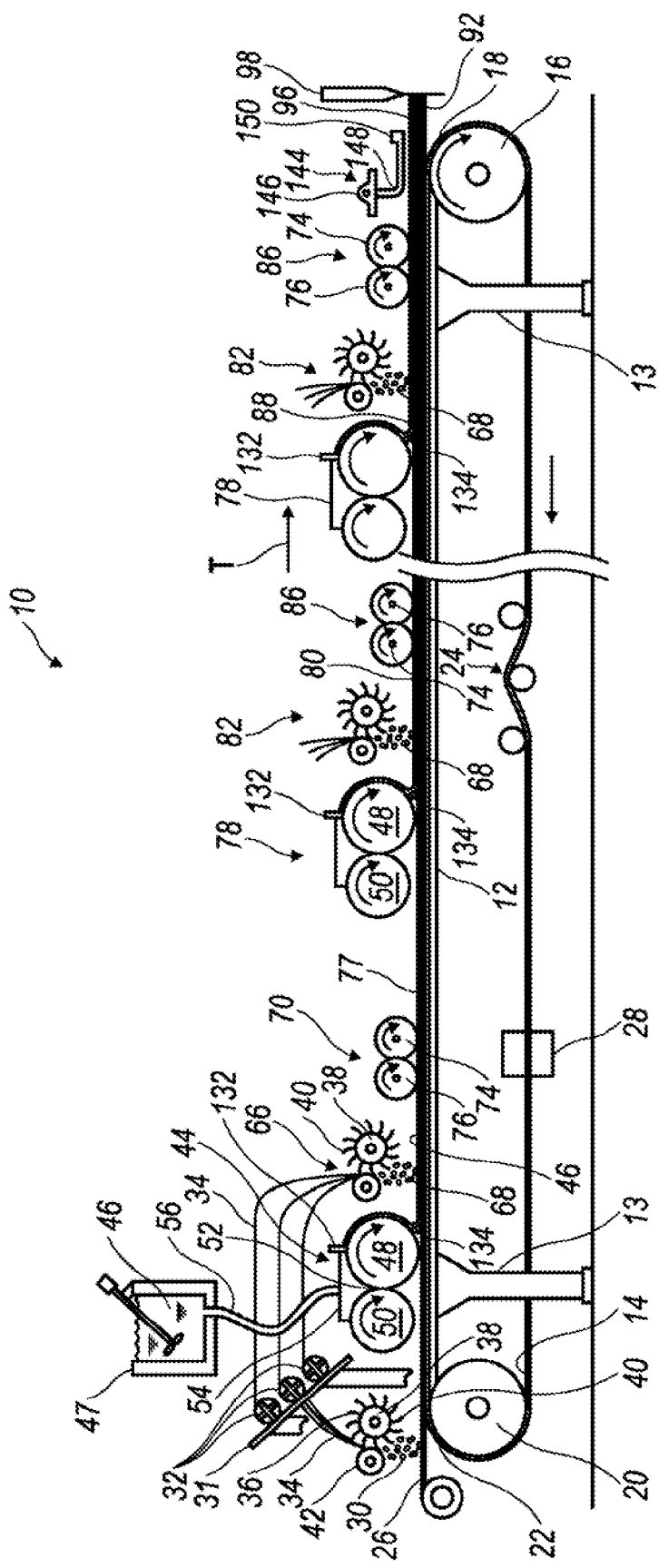
FIG. 1 is a diagrammatic elevational view of an SCP panel production line suitable for use with the present slurry mixing device.

Referring now to FIG. 1, a structural panel production line is diagrammatically shown and is generally designated 10. The production line 10 includes a support frame or forming table 12 having a plurality of legs 13 or other supports. Included on the support frame 12 is a moving carrier 14, such as an endless rubber-like conveyor belt with a smooth, water-impervious surface, however porous surfaces are contemplated. As is well known in the art, the support frame 12 may be made of at least one table-like segment, which may include designated legs 13 or other support structure. The support frame 12 also includes a main drive roll 16 at a distal end 18 of the frame, and an idler roll 20 at a proximal end 22 of the frame. Also, at least one belt tracking and/or tensioning device 24 is typically provided for maintaining a desired tension and positioning of the carrier 14 upon the rolls 16, 20. In this embodiment, the SCP panels are produced continuously as the moving carrier proceeds in a direction "T" from the proximal end 22 to the distal end 18.

In this embodiment, a web 26 of Kraft paper, release paper, or a plastic carrier, for supporting a slurry prior to setting, may be provided and laid upon the carrier 14 to protect it and/or keep it clean.

However, it is also contemplated that, rather than the continuous web 26, individual sheets (not shown) of a relatively rigid material, e.g., sheets of polymer plastic, may be placed on the carrier 14.

It is also contemplated that the SCP panels produced by the present line 10 are formed directly upon the carrier 14. In the latter situation, at least one belt washing unit 28 is provided. The carrier 14 is moved along the support frame 12 by a combination of motors, pulleys, belts or chains which drive the main drive roll 16 as is known in the art. It is contemplated that the speed of the carrier 14 may vary to suit the product being made.

Chopper

In the present invention, structural cement panel (SCP panel) production is initiated by depositing a layer of loose, chopped fibers 30 of about one inch in size upon a plastic carrier on the web 26. A variety of fiber depositing and chopping devices are contemplated by the present line 10. For example, a typical system employs a rack 31 holding several spools 32 of fiberglass cord, from each of which a length or string 34 of fiber is fed to a chopping station or apparatus, also referred to as a chopper 36. Typically a number of strands of fiberglass are fed at each of the chopper stations.

The chopper 36 includes a rotating bladed roll 38 from which project radially extending blades 40 extending transversely across the width of the carrier 14, and which is disposed in close, contacting, rotating relationship with an anvil roll 42. In the preferred embodiment, the bladed roll 38 and the anvil roll 42 are disposed in relatively close relationship such that the rotation of the bladed roll 38 also rotates the anvil roll 42, however the reverse is also contemplated. Also, the anvil roll 42 is preferably covered with a resilient support material against which the blades 40 chop the cords 34 into segments. The spacing of the blades 40 on the roll 38 determines the length of the chopped fibers. As is seen in FIG. 1, the chopper 36 is disposed above the carrier 14 near the proximal end 22 to maximize the productive use of the length of the production line 10. As the fiber strands 34 are chopped, the fibers fall loosely upon the carrier web 26.

Slurry Mixer

Figure 1A:
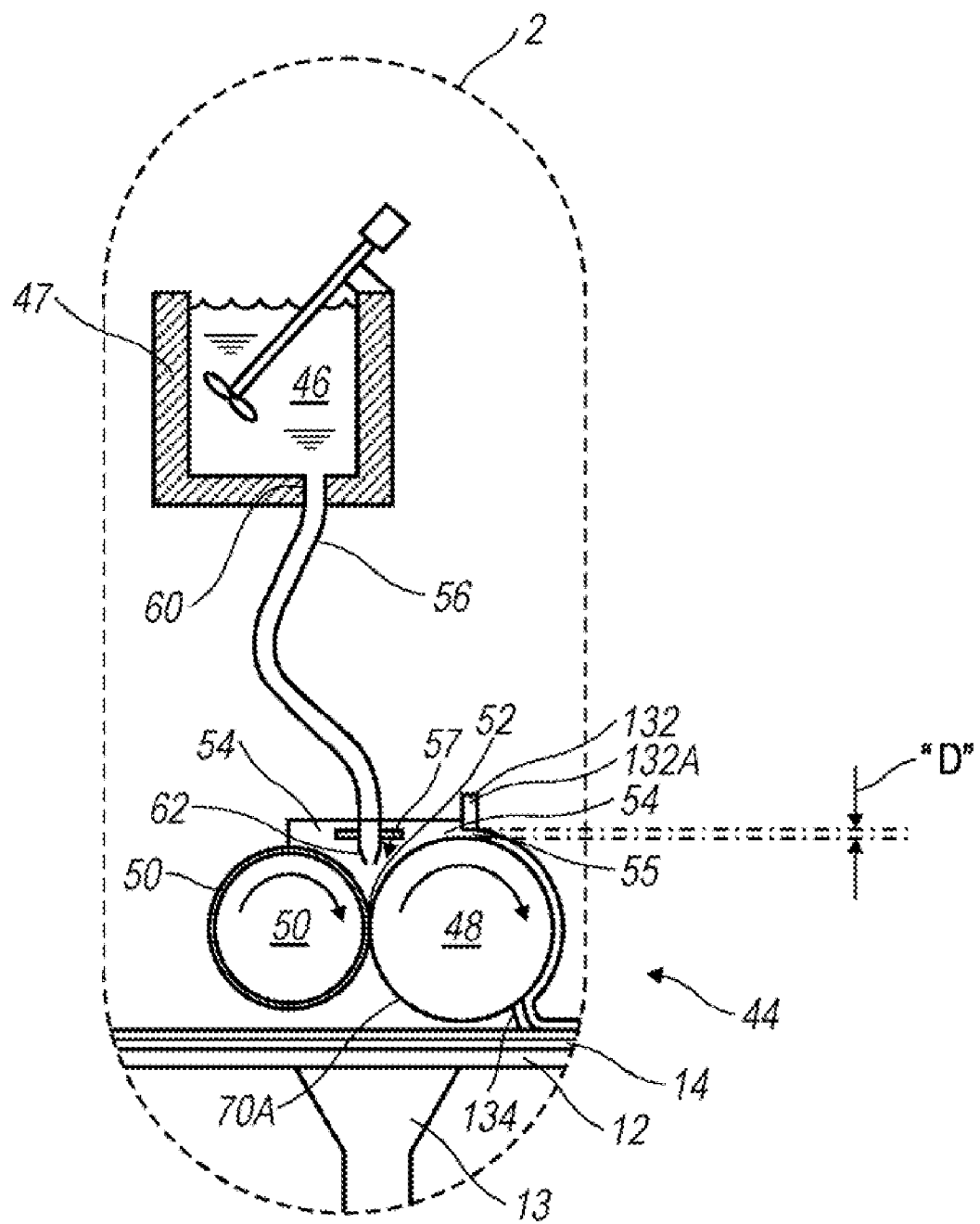
FIG. 1A is a schematic view of a mixer feeding a headbox of the SCP panel production line of FIG. 1.
Figure 1B:
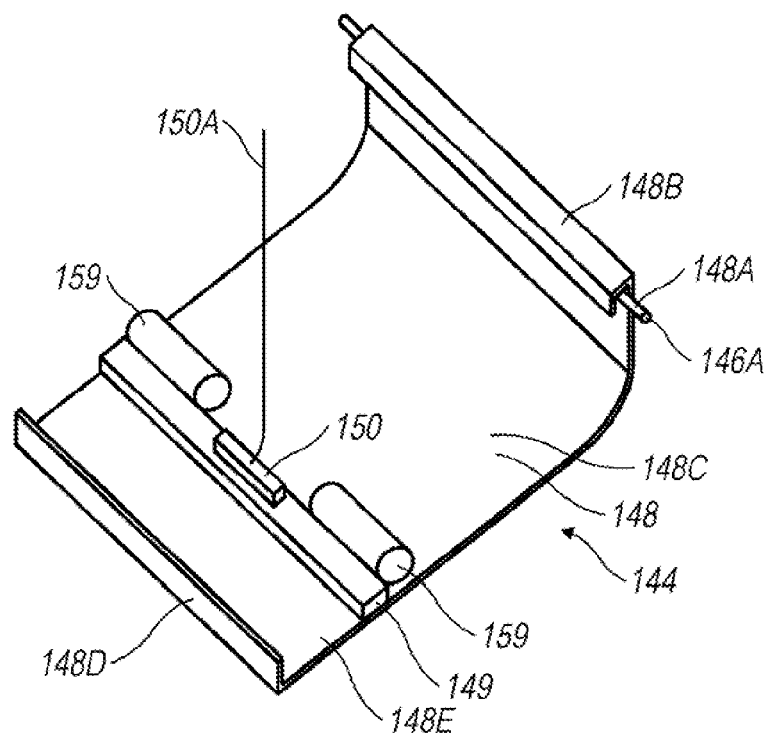
FIG. 1B is a schematic view of a smoothing device used to assist the forming the SCP panel in the production line of FIG. 1.

The present production line 10 includes a slurry preparation and feeding section 2 (FIG. 1A). Slurry preparation and feeding section 2 includes a slurry feed station or slurry feeder or slurry headbox, generally designated 44 and a source of slurry, which in this embodiment is a wet mixer 47. The slurry feeder 44 receives a supply of slurry 46 from the wet mixer 47 for depositing the slurry 46 on chopped fibers on the carrier web 26. It is also contemplated that the process may begin with the initial deposition of slurry upon the carrier 14.

While a variety of settable slurries are contemplated, the present process is particularly designed for producing structural cement panels (SCP panels). As such, the slurry 46 is preferably comprised of varying amounts of Portland cement, gypsum, aggregate, water, accelerators, plasticizers, foaming agents, fillers and/or other ingredients well known in the art, and described in the patents listed below which have been incorporated by reference. The relative amounts of these ingredients, including the elimination of some of the above or the addition of others, may vary to suit the intended use of the final product.

U.S. Pat. No. 6,620,487 to Tonyan et al., incorporated herein by reference in its entirety, discloses a reinforced, lightweight, dimensionally stable structural cement panel (SCP) which employs a core of a continuous phase resulting from the curing of an aqueous mixture of calcium sulfate alpha hemihydrate, hydraulic cement, an active pozzolan and lime. The continuous phase is reinforced with alkali-resistant glass fibers and containing ceramic microspheres, or a blend of ceramic and polymer microspheres, or being formed from an aqueous mixture having a weight ratio of water-to-reactive powder of 0.6/1 to 0.7/1 or a combination thereof. At least one outer surface of the SCP panels may include a cured continuous phase reinforced with glass fibers and containing sufficient polymer spheres to improve nailability or made with a water-to-reactive powders ratio to provide an effect similar to polymer spheres, or a combination thereof.

If desired the composition may have a weight ratio of water-to-reactive powder of 0.4/1 to 0.7/1.

Various formulations for the composite slurry used in the current process are also shown in published US applications US 2006/185267, US 2006/0174572; US 2006/0168905 and US 2006/0144005, all of which are incorporated herein by reference in their entirety. A typical formulation would comprise as the reactive powder, on a dry basis, 35 to 75 wt. % calcium sulfate alpha hemihydrate, 20 to 55 wt. % hydraulic cement such as Portland cement, 0.2 to 3.5 wt. % lime, and 5 to 25 wt. % of an active pozzolan. The continuous phase of the panel would be uniformly reinforced with alkali-resistant glass fibers and would contain 20-50% by weight of a uniformly distributed lightweight filler particles selected from the group consisting of ceramic microspheres, glass microspheres, fly ash cenospheres and perlite. Although the above compositions for the SCP panels are preferred, the relative amounts of these ingredients, including the elimination of some of the above or the addition of others, may vary to suit the intended use of the final product.

Figure 2:
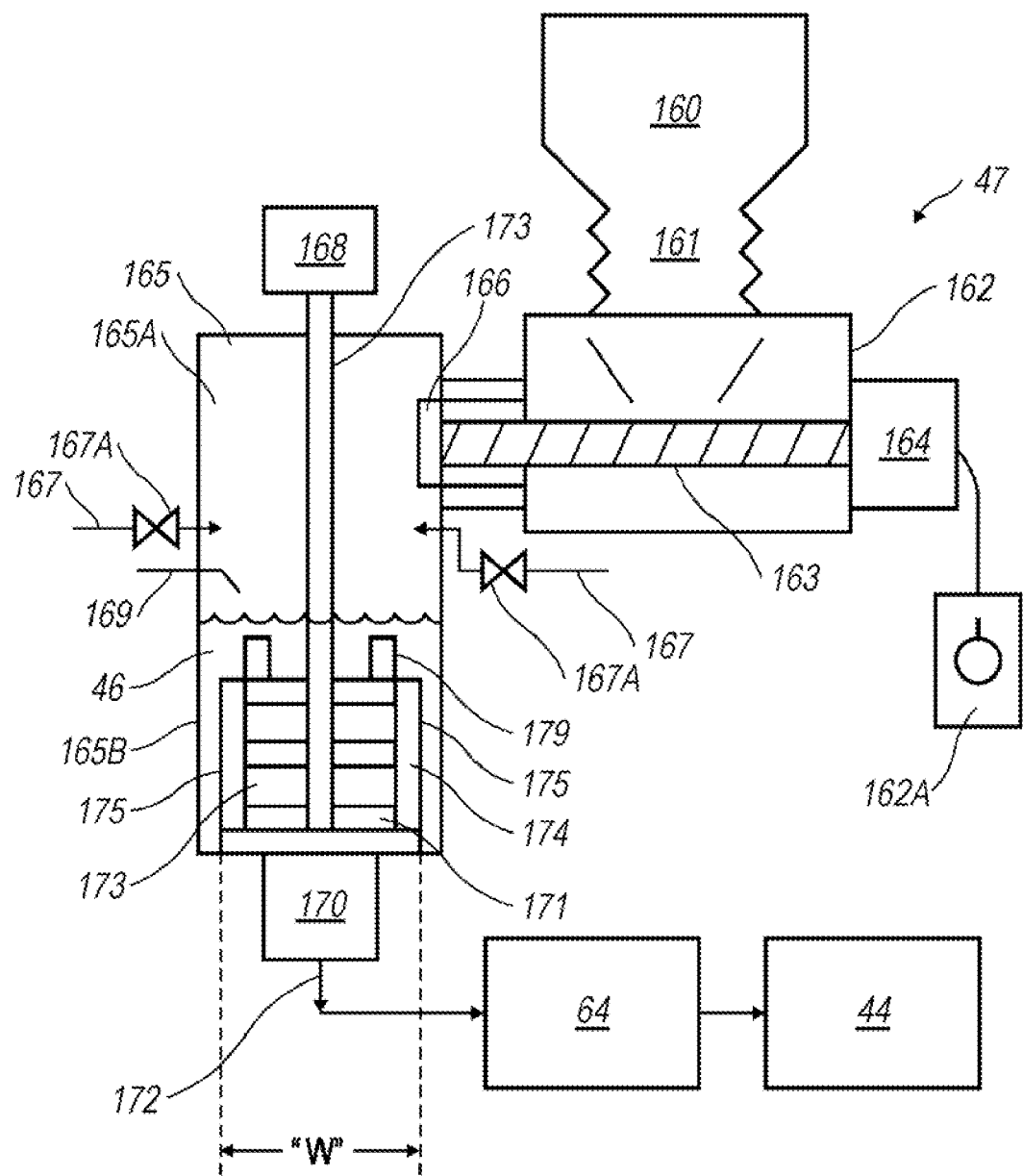
FIG. 2 is a schematic illustration of a wet slurry mixing apparatus with a horizontal feed of the powder directly into a vertically oriented mixing chamber that is equipped with separate multiple water inlets.

An embodiment of the wet powder mixer 47 is shown in FIG. 2. A powder mixture of Portland cement, gypsum, aggregate, fillers, etc. is fed from an overhead hopper bin 160 through a bellows 161 to a horizontal chamber 162 which has an auger screw 163 driven by a side mounted auger motor 164. The solids may be fed from the hopper bin 160 to the auger screw 163 by a volumetric feeder or a gravimetric feeder (not shown).

Volumetric feeding systems would use the auger screw conveyor 163 running at a constant speed to discharge powder from the storage hopper bin 160 at a constant rate (volume per unit time, e.g., cubic feet per minute. Gravimetric feeding systems generally use a volumetric feeder associated with a weighing system to control the discharge of powder from the storage hopper bin 160 at a constant weight per unit of time, e.g., pounds per minute. The weight signal is used via a feedback control system to constantly monitor the actual feed rate and compensate for variations in bulk density, porosity, etc. by adjusting the speed (RPM) of the auger screw 163.

The auger screw 163 feeds the powder directly into the vertical mixing chamber 165 through powder inlet 166 located in an upper section 165A of the vertical mixing chamber 165. Then the powder drops by gravity into the agitator equipped lower section 165B of the vertical mixing chamber 165.

Liquid comprising water is simultaneously supplied to the vertical chamber 165 by water inlets 167, e.g. nozzles, disposed around the perimeter of the upper portion 165A of the chamber 165 at a point below the dry powder inlet 166 so that it also drops to the level of the agitator section (lower portion 165B) of the vertical chamber 165. The direction of the individual water inlets 167 can be manually adjusted to be directed on the paddle blades, etc. to maintain the surfaces free from powder build-up. The individual water inlets 167 may be provided with valves 167A. Dropping the powder and liquid separately into the vertical chamber 165 advantageously avoids clogging at the inlet of the powder to the chamber 165, that might occur if the liquid and powder were mixed before entering the chamber 165, and permits feeding the powder directly into the vertical chamber using a smaller outlet for the auger 163 than would be used if the liquid and powder were mixed before entering the chamber 165.

The water and powder are thoroughly mixed by the mixer paddle 174 which has multiple paddle blades 175 that are rotated on the paddle central shaft 173 by the top mounted electric motor 168. The number of paddle blades 175 on the central shaft and the configuration of the paddle blades 175 including the number of horizontal bars 171 used in each paddle blade 175 can be varied. For example, vertically mounted pins 179 (FIG. 2) may be added to the horizontal bars 171 of the blades 175 to enhance agitation of the slurry 46. Typically the bars 171 are flat horizontal members rather than angled, to reduce the vortex in the lower portion 165B of the mixing chamber 165. In the current embodiment, it has been found that a dual bladed paddle 174 with a lower number of horizontal bars 171 can be used in view of the higher mixing speeds obtained in a typical 12 inch diameter vertical chamber 165 of the present invention. The paddles for embodiments of the present invention for mixing SCP slurry are designed to accommodate the slurry and the diameter of the lower portion of the mixing chamber 165. Increasing the diameter of the lower portion of the mixing chamber results in increasing the transverse width "W" (FIG. 2) of the paddle 174. The increased transverse width "W" (FIG. 2) of the paddle 174 increases its tip speed at a given RPM. This causes a problem because the paddle is more likely to fling the slurry to the outer edges of the vertical mixing chamber 165 and create an undesirable deep vortex in the middle of the lower portion of the mixing chamber 165. The paddle for being employed with SCP slurry is preferably designed to minimize this problem by minimizing the number of horizontal mixing bars and flattening the horizontal mixing bars to minimize turbulence while still ensuring adequate mixing.

The level of the slurry 46 in the vertical mixing chamber 165 is controlled by electrical level control sensor 169 disposed within the vertical mixing chamber 165. The control sensor 169 controls the flow of water through electronically controlled valves 167A and controls the powder feed into the vertical chamber 165 by turning the auger motor 164 on or off via a controller 162A. The control of the volume of added water and slurry is thus used to control both the volume of the slurry in the vertical mixing chamber 165 and the mixing residence time in the vertical mixing chamber 165. Once the slurry 46 is adequately mixed, it is pumped from the bottom of the vertical mixing chamber 165 by the slurry pump 170 to the slurry feeding apparatus 44 by means of pump outlet 172. The pump 170 is run by the paddle central shaft 173 that is driven by the top mounted electric motor 168. However, a separate pump motor (not shown) could be used to drive the pump 170 if desired.

The mixing residence time of the powder and water in the vertical mixing chamber 165 is important to the design of the vertical chamber 165. The slurry mixture 46 must be thoroughly mixed and be of a consistency that can be easily pumped and deposited uniformly over the much thicker fiberglass layer on the web.

To result in adequately mixed slurry 46, the vertical chamber 165 provides a suitable mixing volume for an average slurry residence time of typically about 10 to about 360 seconds while the spinning paddle 174 applies shear force to the slurry in the mixing chamber. Typically, the vertical chamber 165 provides an average slurry residence time of about 15 to about 240 seconds. The RPM range of the mixer paddle 174 is typically 70 RPM to 270 RPM. Other typical ranges for average slurry residence time are from about 15 seconds to about 30 seconds or about 20 seconds to about 60 seconds.

A typical embodiment of a vertical chamber 165 of the mixer 47 has a nominal inside diameter of about 8 to 14 inches (20.3 to 35.6 cm) or 10 to 14 inches (25.4 to 35.6 cm), e.g., 12 inches (30.5 cm.), a total vertical height of about 20 to 30 inches (50.8 to 76.2 cm), e.g., about 25 inches (63.5 cm) and a vertical height below sensor 169 of about 6 to 10 inches (15.2 to 25.4 cm), e.g. about 8 inches (20.3 cm.). As the diameter increases, the paddles should be designed to accommodate these larger diameters to minimize the vortex effect caused by increases paddle tip speed at a given RPM as discussed above. The outer tips of the paddles are generally designed to be close, e.g., within about a quarter inch (0.64 cm) or about an eighth inch (0.32 cm), of the inner walls of the chamber 165. Too great a distance between the paddle tips and the inner walls of the chamber 165 would result in slurry build-up.

FIG. 2 shows the mixer 47 feeds dry cementitious powder directly into the chamber 165 and feeds liquid directly into the chamber 165 separately from the dry cementitious powder. Thus, mixer 47 causes the powder and liquid to drop independently generally downwardly through a space in the vertical mixing chamber between their respective inlets in the upper portion 165A of the mixing chamber 165 and the pool of slurry in the lower portion 165B of the mixing chamber 165. Typically both the solids and liquids drop at least 6 inches. Preferably the solids are fed to the chamber 165 at a point higher than the inlets for the liquid to the chamber 165.

The vertically mounted paddle 174 has an extended central shaft 173 as shown in FIG. 2. The design of the paddle 174, the number of paddle blades 175, and the number of horizontal bars 171 used with or without vertical mounted pins 179, is determined taking into account the speed of rotation of the mixer paddle 174, slurry viscosity, etc. to achieve the amount of mixing of the powder and water to prepare the wet slurry within the residence time of the slurry in the chamber to ensure continuous operation of the panel production line 10.

Suitable slurry mixers 47 are explained in greater detail in U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006; and U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006; both incorporated herein by reference in their entirety.

Slurry Feed Apparatus

Referring now to FIGS. 1-1A, as mentioned above, the present slurry feed apparatus, also referred to as a slurry feed station, a slurry feeder or slurry headbox, generally designated 44 receives a supply of slurry 46 from the wet mixer 47.

The preferred slurry feeder 44 includes a main metering roll 48 disposed transversely to the direction of travel "T" of the carrier 14. A companion or back up roll 50 is disposed in close, parallel, rotational relationship to the metering roll 48. Slurry 46 is deposited in a nip 52 between the two rolls 48, 50.

The slurry feeder 44 also has a gate 132 mounted to sidewalls 54 of the slurry feed apparatus 44 to be mounted adjacent to the surface of the metering roll 48 to form a nip 55 therebetween. As seen in FIG. 1A, the gate 132 is above the metering roll 48 so that the nip 55 is between the gate 132 and an upper portion of the roll 48. The rolls 48, 50 and gate 132 are disposed in sufficiently close relationship that the nip 55 retains a supply of the slurry 46, at the same time the rolls 48, 50 rotate relative to each other. The gate 132 is provided with a vibrator (not shown). As seen in FIG. 1A, the metering roll 48 rotates from the nip 52 to the nip 55.

While other sizes are contemplated, typically the metering roll 48 has a larger diameter than the companion roll 50.

Also, typically one of the rolls 48, 50 has a smooth, stainless steel exterior, and the other, preferably the companion roll 50, has a resilient, non-stick material covering its exterior.

In particular, the gate 132 comprises a blade 132A mounted to a vibrating gate support shaft/bar (not shown) and, optionally a stiffening member (not shown) mounted to the vibrating gate support shaft/bar. The gate blade 132A is typically made of 16-12 gauge stainless sheet metal.

The gate 132 is vibrated by means of a rotary vibrator (not shown) mounted on the side opposite the blade of the stiffening member. The stiffening member being attached to the backside of the vibrating gate support shaft and vibrating gate 132. If the stiffening member is not provided then the rotary vibrator may be attached to the gate support shaft or other suitable portion of the gate 132. The vibrating means is typically a pneumatic rotary ball vibrator. The level of vibration can be controlled with a conventional air regulator (not shown).

The stiffening member functions not only to stiffen the slurry gate, but, by mounting the vibratory unit on this stiffening member, this distributes the vibration across the length of the device more evenly. For example, if we mount the vibratory unit directly to the slurry gate, without the stiffening member, the vibration from the vibratory unit would be highly localized at the mounting point, with relatively little vibration out on the edges of the sheet. This is not to say that the vibratory unit cannot be mounted anywhere besides the stiffening member, but it is a preferred location since a stiffening member is typically employed and it does a good job of equally distributing the vibration.

The gate 132 may be mounted to the sidewalls 54 of the headbox 44 by a support system (not shown) to permit the position of the blade to be adjusted the horizontally, vertically as well. The support system includes a pivot pin attached, respectively, to each end of the gate support shaft and seated in an adjustable mount attached to a sidewall 54 of the slurry feed apparatus. An embodiment of the adjustable mount has a pivot yoke seated in a U-shaped member. Screws pass through the upwardly extending legs of the U-shaped mount to permit forward and backwards adjustment of the position of the pivot yoke, and in turn the gate 132. Also, bolts are provided through holes of the U-shaped member for permitting up and down adjustment of the position of the pivot yoke, and in turn the gate 132.

Preferably, the vibrating gate 132 may be pivotally adjusted to vary the gap "D" (FIG. 1A) between the gate 132 and the metering roll 48 by means of an pivoting adjustment system (not shown).

The vibrating gate 132 helps to prevent significant build-up of slurry 46 on the gate 132 and controls the thickness of the slurry 46 deposited on the metering roll 48. The vibrating gate 132 can easily be removed from the wall mounts for cleaning and maintenance.

Additional details of the slurry feeder (headbox) 44 are disclosed in U.S. patent application Ser. No. 11/591,647, ENTITLED PROCESS AND APPARATUS FOR FEEDING CEMENTITIOUS SLURRY FOR FIBER-REINFORCED STRUCTURAL CEMENT PANELS, filed Nov. 1, 2006 and incorporated herein by reference in its entirety.

Typically the slurry feeder 44 has a pair of relatively rigid sidewalls 54 (one shown), preferably made of, or coated with non-stick material such as TEFLON® material or the like. The sidewalls 54 prevent slurry 46 poured into the nip 52 from escaping out the sides of the slurry feeder 44. The sidewalls 54, which are preferably secured to the support frame 12 (FIG. 1), are disposed in close relationship to ends of the rolls 48, 50 to retain the slurry 46. However, the sidewalls 54 are not excessively close to ends of the rolls to interfere with roll rotation.

The slurry feeder 44 deposits an even layer of the slurry 46 of relatively controlled thickness upon the moving carrier web 26. Suitable layer thicknesses range from about 0.08 inch to 0.16 inch. However, with four layers preferred in the structural panel produced by the production line 10, and a suitable building panel being approximately 0.5 inch, an especially preferred slurry layer thickness is in the range of 0.125 inch. However, for a target panel forming thickness is about 0.84", the standard layer thickness is typically closer to about 0.21 inches at each of the 4 forming stations. A range of 0.1 inch to 0.3 inch per headbox may also be suitable.

Thus, the relative distance "D" (FIG. 1A) between the vibrating gate 132 and the main metering roll 48 may be adjusted to vary the thickness of the slurry 46 deposited. The nip distance "D" between the gate 132 and the metering roll 48 is typically maintained at a distance of about ⅛ to about ⅜ inches (about 0.318 to about 0.953 cm). However, this can be adjusted based upon the viscosity and thickness of the slurry 46 and the desired thickness of the slurry to be deposited on the web 26.

To ensure a uniform disposition of the slurry 46 across the entire web 26, the slurry 46 is delivered to the slurry feeder 44 through a hose 56 or similar conduit having a first end 60 (FIG. 1A) in fluid communication with the outlet of the slurry mixer or reservoir 47. A second end 62 of the hose 56 is connected to a laterally reciprocating, cable driven, fluid-powered dispenser 64 (FIG. 1A) of the type well known in the art. Slurry flowing from the hose 56 is thus poured into the feeder 44 in a laterally reciprocating motion to fill a reservoir 57 defined by the rolls 48, 50 and the sidewalls 54 of the slurry feeder 44. Rotation of the metering roll 48 draws a layer of slurry 46 from the reservoir 57.

The reciprocating dispensing mechanism 64 is explained in greater detail in U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006 and incorporated herein by reference in its entirety as well as U.S. Pat. No. 6,986,812 to Dubey et al. incorporated herein by reference in its entirety.

Another feature of the present feeder apparatus 44 is that the main metering roll 48 and the companion roll 50 are both driven in the same direction which minimizes the opportunities for premature setting of slurry on the respective moving outer surfaces. A drive system (not shown), including a fluid-powered, electric or other suitable motor is connected to the main metering roll 48 or the companion roll 50 for driving the roll(s) in the same direction, which is clockwise when viewed in FIGS. 1 and 1A. As is well known in the art, either one of the rolls 48, 50 may be driven, and the other roll may be connected via pulleys, belts, chain and sprockets, gears or other known power transmission technology to maintain a positive and common rotational relationship.

As the slurry 46 on the outer surface 70A moves toward the moving carrier web 26, it is important that all of the slurry be deposited on the web, and not travel back upward toward the nip 52. Such upward travel would facilitate premature setting of the slurry 46 on the rolls 48, 50 and would interfere with the smooth movement of slurry from the reservoir 57 to the carrier web 26.

To assist in this, the slurry feeder 44 has a doctor blade 134 (FIG. 1A) located between the main metering roll 48 and the carrier web 26 to ensure that the relatively thin slurry 46 is completely deposited as a continuous curtain or sheet of slurry is uniformly directed down to within a distance of about 1.0 to about 1.5 inches (2.54 to 3.81 cm.) of the carrier web 26. The doctor blade 134 ensures the slurry 46 uniformly covers the fiberglass fiber layer upon the carrier web 26 and does not proceed back up toward the nip 52 and the feeder reservoir 57. The doctor blade 134 also helps keep the main metering roll 50 free of prematurely setting slurry 46.

The doctor blade 134 is an improvement over prior art stripping wires used in early slurry feeding systems and which allowed thinner slurries to deposit as drops of slurry on the web.

The doctor blade 134 is mounted on a doctor blade support shaft (not shown) mounted on a doctor blade tension arm pivotably mounted to adjustable pivot mount attached to the support frame or sidewall 54 of the slurry feeder 44. A shaft or bar is attached to the sidewalls 54 of the slurry feeder 44 above the metering roller 48. The doctor blade 134 is biased towards the roll 48 by a tensioning spring having a first end attached to the shaft or bar and a second end attached to the free end of the doctor blade tension arm. Thus, the doctor blade 134 is held in a position adjacent to the outer surface of the metering roll 48 by the tensioning arm and tensioning spring. The position of the doctor blade 134 can be adjusted by adjusting the adjustable pivot mount attached to the support frame or sidewall 54 of the slurry feeder 44.

The doctor blade 134 removes the slurry from the surface of the metering roll 48 like the wire used in the process of U.S. Pat. No. 6,986,812 to Dubey et al. The doctor blade 134 also serves to collect the slurry 46 in a uniform layer or curtain and downwardly directs the slurry 46 in the direction of the movement of the web to a point about 1.0 to 1.5 inches (92.54 to 3.81 cm.) over the fiberglass layer on the web to uniformly cover the fiberglass layer with the slurry 46. This is particularly important where thinner slurries are used to cover the fiberglass layer, since thinner slurries have a tendency to drip over wires.

The doctor blade 134 is explained in greater detail in U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006 and incorporated herein by reference in its entirety.

Processing Downstream of the Slurry Feed Apparatus

Referring again to FIG. 1, the other operational components of the SCP panel production line will be described briefly, but they are described in more detail in the following documents:

U.S. Pat. No. 6,986,812, entitled SLURRY FEED APPARATUS FOR FIBER-REINFORCED STRUCTURAL CEMENTITIOUS PANEL PRODUCTION, herein incorporated by reference in their entirety; and the following co-pending, commonly assigned, United States patent applications all herein incorporated by reference in their entirety:

United States Patent Application Publication No. 2005/0064164 A1 to Dubey et al., application Ser. No. 10/666,294, entitled, MULTI-LAYER PROCESS AND APPARATUS FOR PRODUCING HIGH STRENGTH FIBER-REINFORCED STRUCTURAL CEMENTITIOUS PANELS;

United States Patent Application Publication No. 2005/0064055, application Ser. No. 10/665,541, entitled EMBEDMENT DEVICE FOR FIBER-ENHANCED SLURRY;

U.S. patent application Ser. No. 11/555,647, entitled PROCESS AND APPARATUS FOR FEEDING CEMENTITIOUS SLURRY FOR FIBER-REINFORCED STRUCTURAL CEMENT PANELS, filed Nov. 1, 2006;

U.S. patent application Ser. No. 11/555,655, entitled METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006;

U.S. patent application Ser. No. 11/555,665, entitled WET SLURRY THICKNESS GAUGE AND METHOD FOR USE OF SAME, filed Nov. 1, 2006;

U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006; and U.S. patent application Ser. No. 11/591,957, entitled EMBEDMENT ROLL DEVICE, filed Nov. 1, 2006.

Embedment Device

While a variety of embedment devices are contemplated, including, but not limited to vibrators, sheep's foot rollers and the like, in the present embodiment of the embedment device 70 includes at least a pair of generally parallel shafts 76 mounted transversely to the direction of travel of the carrier web 14 on the frame 12. Each shaft 76 is provided with a plurality of relatively large diameter disks 76 which are axially separated from each other on the shaft by small diameter disks (not shown).

During SCP panel production, the shafts 76 and the disks 74 rotate together about the longitudinal axis of the shaft 76. As is well known in the art, either one or both of the shafts 76 may be powered, and if only one is powered, the other may be driven by belts, chains, gear drives or other known power transmission technologies to maintain a corresponding direction and speed to the driven shaft. The respective disks 74 of the adjacent, preferably parallel shafts 76 overlap and are intermeshed with each other for creating a "kneading" or "massaging" action in the slurry, which embeds the previously deposited fibers 68. In addition, the close, intermeshed and rotating relationship of the disks 74 prevents the buildup of slurry 46 on the disks, and in effect creates a "self-cleaning" action which significantly reduces production line downtime due to premature setting of clumps of slurry.

The intermeshed relationship of the disks 74 on the shafts 76 includes a closely adjacent disposition of opposing peripheries of the small diameter spacer disks (not shown) and the relatively large diameter main disks 74, which also facilitates the self-cleaning action. As the disks 74 rotate relative to each other in close proximity (but preferably in the same direction), it is difficult for particles of slurry to become caught in the apparatus and prematurely set. By providing two sets of disks 74 which are laterally offset relative to each other, the slurry 46 is subjected to multiple acts of disruption, creating a "kneading" action which further embeds the fibers 68 in the slurry 46.

An embodiment of embedment device 70 suitable for use in production line 10 is disclosed in greater detail in co-pending U.S. patent application Ser. No. 10/665,541, filed Sep. 18, 2003, published as US 2005/0064055, and entitled EMBEDMENT DEVICE FOR FIBER-ENHANCED SLURRY, and incorporated herein by reference in its entirety.

Another embodiment of embedment devices suitable for use in production line 10 are disclosed by U.S. patent application Ser. No. 10/665,541, filed Sep. 18, 2003, published as US 2005/0064055, and entitled EMBEDMENT DEVICE FOR FIBER-ENHANCED SLURRY;

U.S. patent application Ser. No. 11/591,793, filed Nov. 1, 2006, and entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT; and U.S. patent application Ser. No. 11/591,957, entitled EMBEDMENT ROLL DEVICE, filed Nov. 1, 2006, both incorporated herein by reference in its entirety;

all of which are incorporated herein by reference in their entirety.

Applying Additional Layers

Once the fiber 68 has been embedded, a first layer 77 of the panel 92 is complete. In a preferred embodiment, the height or thickness of the first layer 77 is in the approximate range of 0.05 to 0.15 inches. This range has been found to provide the desired strength and rigidity when combined with like layers in a SCP panel. However other thicknesses are contemplated depending on the final intended use of the SCP panel.

To build a structural cementitious panel of desired thickness, additional layers are typically added. To that end, a second slurry feeder 78, which is substantially identical to the feeder 44, is provided in operational relationship to the moving carrier 14, and is disposed for deposition of an additional layer 80 of the slurry 46 upon the existing layer 77.

Next, an additional chopper 82, substantially identical to the choppers 36 and 66, is provided in operational relationship to the frame 12 to deposit a third layer of fibers 68 provided from a rack (not shown) constructed and disposed relative to the frame 12 in similar fashion to the rack 31. The fibers 68 are deposited upon the slurry layer 80 and are embedded using a second embedment device 86. Similar in construction and arrangement to the embedment device 70, the second embedment device 86 is mounted slightly higher relative to the moving carrier web 14 so that the first layer 77 is not disturbed. In this manner, the second layer 80 of slurry and embedded fibers is created.

Figure 1C:
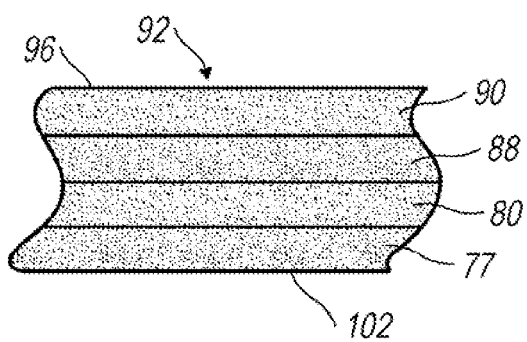
FIG. 1C is a fragmentary vertical section of a structural cementitious panel produced according to the present procedure.

Referring now to FIGS. 1 and 1C, with each successive layer of settable slurry and fibers, an additional slurry feeder station 78 followed by a fiber chopper 82 and an embedment device 86 is provided on the production line 10. In the preferred embodiment, four total layers 77, 80, 88, 90 are provided to form the SCP panel 92.

An important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described herein, it will be virtually impossible to delaminate the panel 92 produced by the present process.

Forming and Smoothing and Cutting

Upon the disposition of the four layers of fiber-embedded settable slurry as described above, a forming device may provided to the frame 12 to shape an upper surface 96 of the panel 92.

However, forming devices such as spring-loaded or vibrating plates or vibrating leveling screeds which are designed to conform the panel to suit desired dimensional characteristics are not used since they scrape away excess thickness of SCP panel material are not employed. Such devices would not effectively scrape away or flatten the panel surface. They would cause the fiberglass to begin to roll up and mar the surface of the panel instead of flattening and smoothing it.

Figure 3:
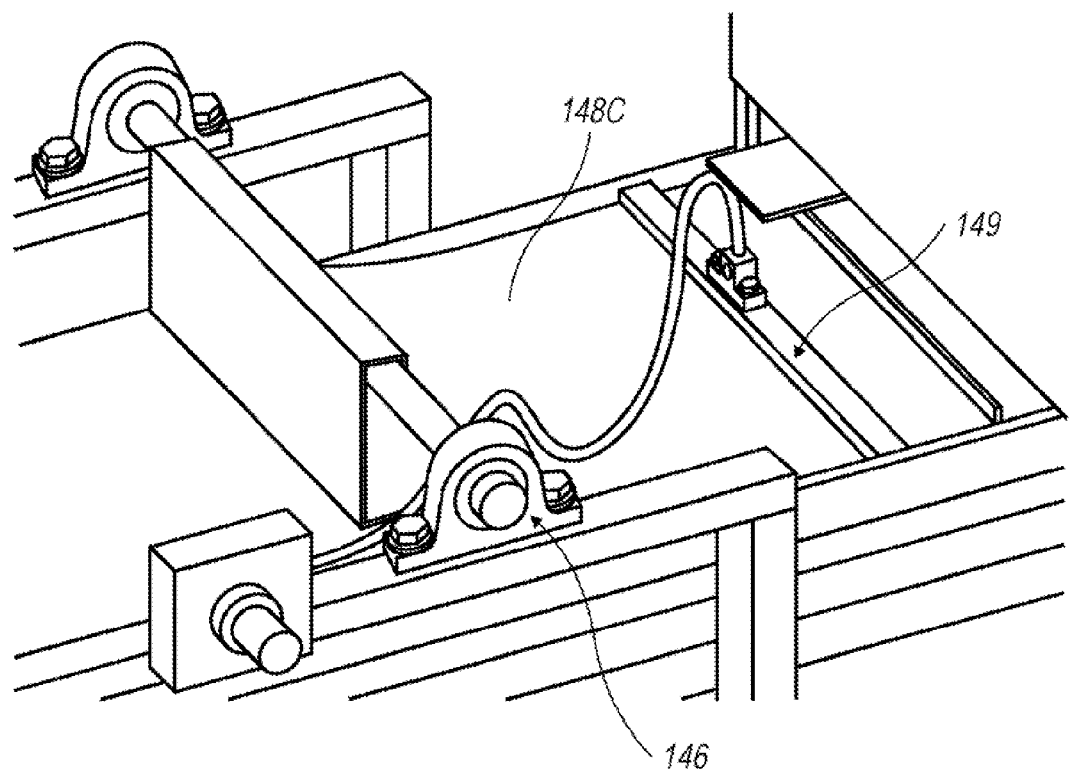
FIG. 3 shows the flexible smoothing device as it used in contact with the slurry on the web as it travels from the last forming station.

Rather than spring-loaded devices and vibrating leveling screeds, the production line 10 includes a smoothing device, also termed a vibrating shroud, 144 provided to the frame 12 to gently smooth an upper surface 96 of the panel 92. The smoothing device 144 includes a mounting stand 146 (FIG. 1, FIG. 3 and FIG. 6), a flexible sheet 148 secured to the mounting stand, a stiffening member 149 extending the width of the sheet 148 and a vibration generator (vibrator) 150 preferably located on the stiffening member to cause the sheet 148 to vibrate.

The stiffening member 149 functions not only to stiffen the smoothing sheet, but, by mounting the vibratory unit on this stiffening member, this distributes the vibration across the length of the device more evenly. For example, if we mount the vibratory unit directly to the smoothing sheet (say, in the center), without the stiffening member, the vibration from the vibratory unit would be highly localized at the mounting point, with relatively little vibration out on the edges of the sheet. This is not to say that the vibratory unit cannot be mounted anywhere besides the stiffening member 149, but it is a preferred location since a stiffening member is typically anyway and it does a good job of equally distributing the vibration.

The sheet 148 has a first upstanding wall 148A provided with a U-shaped upper portion 148B, a curved wall 148C and a second upstanding wall 148D. The vibrator 150 is powered by a pneumatic hose 150A. The curved panel 148C of the smoothing device 144 has an upstream end pivotally attached to a support bar 146A which in turn is attached to mount 146 on the production line 10. The curved panel 148C has a trailing downstream end 148E which contacts the topmost layer of the SCP material passing underneath it.

The flexible smoothing sheet is typically made of metal or polymer, e.g., 14 gauge stainless steel. The pivoting approximately 90° angle between the first upstanding wall 148A and the curved wall 148C allows the sheet to stretch slightly with the direction of travel of the SCP panel to add increased flexibility. The pivoting connection to the stand 146 allows the sheet 148 to ride up and down with the SCP panel passing underneath the sheet 148.

Optionally the smoothing device 144 is provided with weights 159 to assist in smoothing the surface of the topmost layer of slurry. The smoothing device 144 may be provided after the last embedment station 86 or respective shrouds may be provided after each embedment station 70, 86.

By applying vibration to the slurry 46, the smoothing device 144 facilitates the distribution of the fibers 30, 68 throughout the panel 92, and provides a more uniform upper surface 96.

In particular, the multiple layers of slurry 46 leaving the final embodiment rollers of the final forming station, the web and slurry layers travel under the flexible vibrating smoothing device or shroud 144 shown in FIG. 1B and FIGS. 3-5. The curved panel 148C of the smoothing device 144 has an upstream end pivotally attached to a support bar 146A which in turn is attached to mounting support station 146 on the top surface of the side dams on the production line 10. The curved panel 148C has a trailing downstream end portion 148E. A second upstanding wall 148D extends upwardly from the downstream end of the curved panel 148C. The downstream end portion 148E contacts the topmost layer of the formed SCP slurry passing underneath it on the traveling web. The contact of the slurry layer with the trailing end 148E of the curved panel 148C is typically limited to the final 12 to 16 inches (30.5 to 40.6 cm.) of the downstream end portion of the lower surface of the flexible sheet 148. The stiffening member 149 is located on the top surface of the sheet at a location about 6 to about 8 inches (15.2 to 20.3 cm.) from the end of the flexible sheet 148. Typically the stiffening member 149 is located at about the mid point of the area of the flexible sheet 148 in contact with the top surface 96 of the formed panel 92. The flexible sheet 148 of the smoothing device 144 is vibrated by a vibrator 150 mounted on a central portion of the stiffening member 149. The vibrator is supplied by air line 150A. The vibrator 150 imparts vibration to the entire contact surface of the flexible sheet 148 to in turn vibrate the formed slurry as it travels along the web. The optional weights 159 are mounted on each side of the flexible sheet surface 148C over a portion of the sheet in contact with the slurry surface. The optional weights 159 counter the tendency for the sides of the slurry 46 to "bow" upward as the center of the formed panel 92 is under pressure imparted by the center of the vibrating stiffening member 149.

As seen in FIG. 1B and FIGS. 3-5, the flexible sheet 148 of the smoothing device 144 is pivotally mounted to a transverse support bar 146A through a hinge 148B on the first upstanding wall 148A to the pivot mounting stands 146 (FIG. 6) on the top of each of the web side dams. This pivotable mounting allows the sheet 148 to "float" up and down over the top surface of the formed panel. In one embodiment, the flexible shroud is about 2 to 4 feet (0.61 to 1.22 m), e.g., 3 feet (0.91 m.) in length and about 40 to 60 (1 to 1.5 m), e.g., 50 inches (1.27 m.) in width, corresponding to the width of the formed panel.

The stiffening member 149 is used to reduce the chances for variation of the thickness of the formed panel by flexing or warping of the thin flexible smoothing sheet.

Figure 1D:
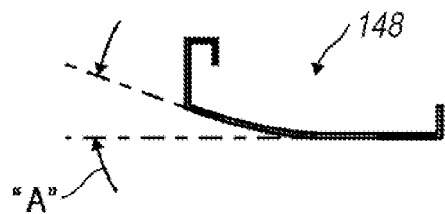
FIG. 1D is a side view of the sheet of the smoothing device of FIG. 1B.

The curved wall 148C of the flexible sheet 148 has having a curved profile for spacing an upstream end of the curved wall 148C from the panel 92 while contacting the downstream portion of the curved wall 148C with the panel 92. Typically the curved panel 148C of the flexible sheet 148 is curved (FIG. 1D) so a small angle "A" of entry, e.g., less than 15°, preferably less than 5°, is provided at the nip point and preferably the angle tapers to zero. This allows for a very gradual, or zero, change in the height of the SCP panel as it contacts the smoothing sheet 148. The closer the feed nip is to 0° (the more gradual angle) the less likely it will be to have the problems associated with angles close to 90°. These problems include the marring of the surface, the rolling up of fiberglass, and the creation of grooves and streaks on the surface. The smoothing device 144 reduces the need for costly finishing after the panels are cured and cut to size.

The vibrating flexible sheet or shroud 148 is in actual contact with the formed panel for about 2 to 10 seconds, based upon the speed of the production line 10, with a preferred contact time of about 5 to 8 seconds, e.g., about 7.5 seconds.

The smoothing device 144 is designed to apply a pressure of about 0.05 to about 0.5 psi (0.036 to 0.36 Kg./sq. cm.) over the area of the panel, with a force of about 0.05 to 0.15 pounds per square inch, e.g. about 0.075 psi (0.054 Kg./sq. cm.), being preferred. This amount of force has been determined to provide the necessary pressure to smooth the surface of the formed panel and eliminate pock marks and grooves, without tearing or disrupting the surface of the fiber reinforced formed panel.

Advantageously, the smoothing sheet performs this smoothing while allowing the glass fibers to retain their random distribution on the surface of the panel. That is, the smoothing sheet does not cause the fibers at the surface to exhibit directionality. Directionality of fibers on the top surface can cause the strength of the board to be significantly higher when tested in, for example, the cross machine direction as opposed to machine direction.

Although the smoothing device 144 is used primarily after the formed product 92 exits the embedment roller 74 of the final embedment station 86, the smoothing device 144 can be used on the production line 10 after any or all of the other embedment stations 70, 86. This is particularly advantageous since the smoothing device 144 also helps to embed the fiber into the top surface 96 of the formed panels 92.

Other forming devices are contemplated as known in the art. However, the smoothing device 144 advantageously avoids disrupting or tearing portions of the SCP panel from carrier web 26. Forming devices that scrape away excess SCP material are not employed because they disrupt or tear the SCP material due to the fibrous nature of the panel product as it is being formed.

After the layers of panel 92 have been smoothed by the smoothing device 144, they will begin to set. Once the layers are set, the respective panels 92 are separated from each other by a cutting device 98, which typically is a water jet cutter. Other cutting devices, including moving blades, are considered suitable for this operation, provided they can create suitably sharp edges in the present panel composition. The cutting device 98 is disposed relative to the production line 10 and the frame 12 so panels, not shown, are produced having a desired length. Since the speed of the carrier 14 is relatively slow, the cutting device may be mounted to cut perpendicularly to the direction of travel of the carrier 14. With faster production speeds, such cutting devices are known to be mounted to the production line 10 on an angle to the direction of web travel. Upon cutting, the separated panels are stacked for further handling, packaging, storage and/or shipment as is well known in the art.

The production line 10 includes sufficient fiber chopping stations 36, 66, 82, slurry feeder stations 44, 78 and embedment devices 70, 86 to produce at least four layers 77, 80, 88 and 90 (FIG. 1C). Additional layers may be created by repetition of stations as described above in relation to the production line 10.

Upon creation of the SCP panels 92, an underside 102 or bottom face of the panel may be smoother than the upper side or top face 96, even after being engaged by the forming device 94. In some cases, depending on the application of the panel 92, it may be preferable to have a smooth face and a relatively rough face. However, in other applications, it may be desirable to have a board in which both faces 96, 102 are smooth. The smooth texture is generated by the contact of the slurry with the smooth carrier 14 or the carrier web 26.

To obtain a SCP panel with both faces or sides smooth, both upper and lower faces 96, 102 may be formed against the carrier 14 or the release web 26 as disclosed by U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

Another alternative (not shown) is to sand one or both faces or sides 96, 102.

Another feature of the present invention is that the resulting SCP panel 92 is constructed so that the fibers 30, 68 are uniformly distributed throughout the panel. This has been found to enable the production of relatively stronger panels with relatively less, more efficient use of fibers. The volume fraction of fibers relative to the volume of slurry in each layer preferably constitutes approximately in the range of 1% to 5% by volume, preferably 1.5% to 3% by volume, of the slurry layers 77, 80, 88, 90. If desired, the outer layers 77, 90 may have a higher volume fraction that either or both of inner layers 80, 88.

Second Embodiment of a Production Line

The incorporation of a volume fraction of loose fibers distributed throughout the slurry 46 is an important factor in obtaining desired panel strength. Thus, improved efficiency in incorporating such fibers is desirable. It is believed the system depicted in FIGS. 1-5 in some cases requires excessive numbers of slurry layers to obtain an SCP panel having sufficient fiber volume fraction.

Figure 6:
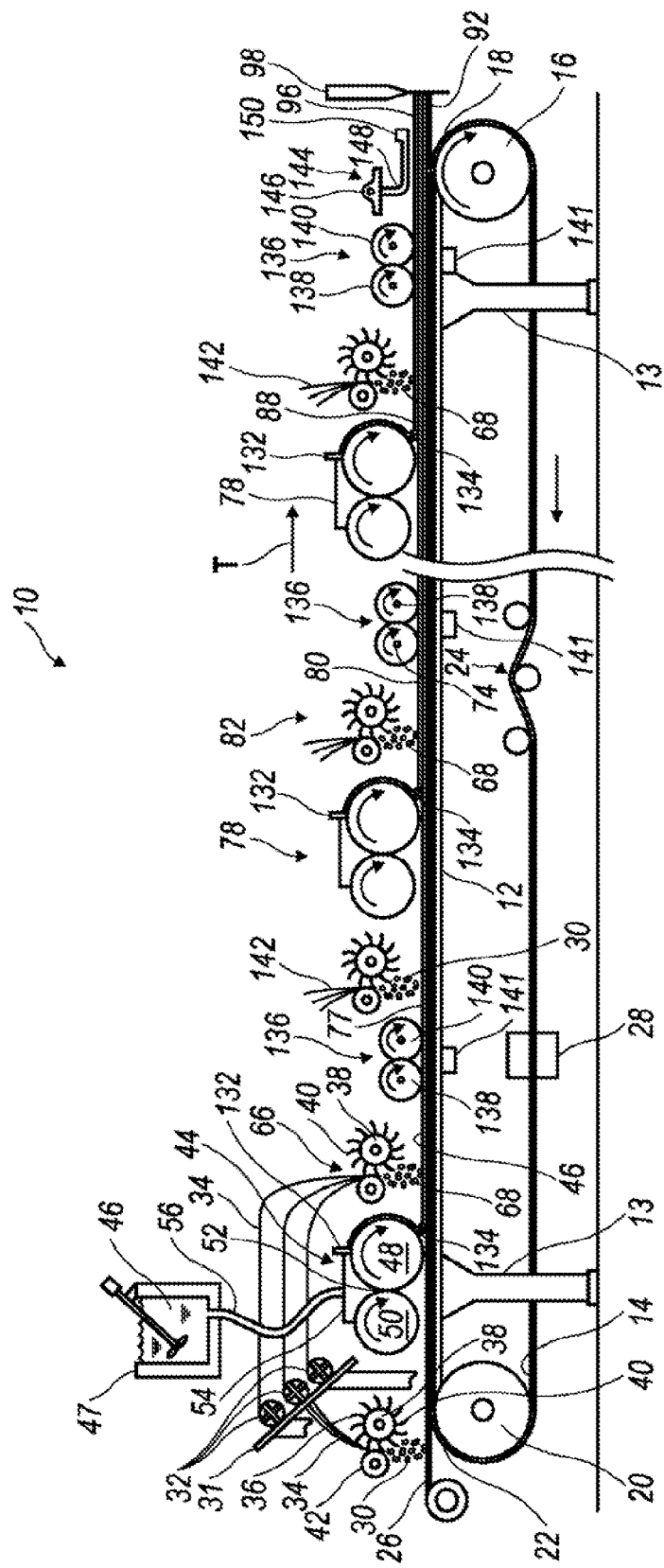
FIG. 6 is a diagrammatic elevational view of a second embodiment of an SCP panel production line suitable for use with the present slurry mixing device.

Accordingly, an alternate SCP panel production line or system is illustrated in FIG. 6 and is generally designated 130 for producing high-performance, fiber reinforced SCP panels incorporating a relatively high volume of fibers per slurry layer. In many cases, increased levels of fibers per panel are obtained using this system. While the system of FIGS. 1-5 discloses depositing a single discrete layer of fibers into each subsequent discrete layer of slurry deposited after the initial layer, the production line 130 includes a method of building up multiple discrete reinforcing fiber layers in each discrete slurry layer to obtain the desired panel thickness. Most preferably, the disclosed system embeds at least two discrete layers of reinforcing fibers, in a single operation, into an individual discrete layer of slurry. The discrete reinforcing fibers are embedded into the discrete layer of slurry using a suitable fiber embedment device.

More specifically, in FIG. 6 components used in the system 130 and shared with the system 10 of FIGS. 1-5 are designated with identical reference numbers, and the above description of those components is considered applicable here. Furthermore, it is contemplated that the apparatus described in relation to FIG. 6 may be combined with that of FIGS. 1-5 in a retrofit manner or be a new construction.

It is also contemplated that the system 130 of FIG. 6 may be provided with the upper deck 106 of U.S. patent application Ser. No. 11/591,793, entitled MULTI-LAYER PROCESS AND APPARATUS FOR PRODUCING HIGH STRENGTH FIBER-REINFORCED STRUCTURAL CEMENTITIOUS PANELS WITH ENHANCED FIBER CONTENT, filed Nov. 1, 2006.

In the alternate system 130, SCP panel production is initiated by depositing a first layer of loose, chopped fibers 30 upon the web 26. Next, the slurry feed station, or the slurry feeder 44 receives a supply of slurry 46 from the remote mixer 47.

It is contemplated that the mixer 47 and slurry 46 in this embodiment are the same as that used in the production line 10 of FIGS. 1-5.

Also, the slurry feeder 44 is basically the same, including the main metering roll, 48 and the back up roll 50 to form the nip 52 and having the sidewalls 54. Suitable layer thicknesses range from about 0.05 inch to 0.35 inch (0.13 to 0.9 cm). For instance, for manufacturing a nominal ¾ inch (1.9 cm) thick structural panel, four layers are preferred with an especially preferred slurry layer thickness less than approximately 0.25 inch (0.64 cm) in the preferred structural panel produced by the present process.

Referring to FIGS. 1A and 6, the slurry 46 is delivered to the feeder 44 through the hose 56 located in the laterally reciprocating, cable driven, fluid powered dispenser 58. Slurry flowing from the hose 56 is thus poured into the feeder 44 in a laterally reciprocating motion to fill the reservoir 57 defined by the rolls 48, 50 and the sidewalls 54. Rotation of the metering roll 48 thus draws a layer of the slurry 46 from the reservoir.

The system 130 is preferably provided with the above-described vibrating gate 132 which meters slurry onto the deposition or metering roll 48. By vibrating, the gate 132 prevents significant buildup in the corners of the headbox 44 and provides a more uniform and thicker layer of slurry than was provided without vibration.

Even with the addition of the vibrating gate 132, the main metering roll 48 and the backup roll 50 are rotatably driven in the same direction of travel "T" as the direction of movement of the carrier 14 and the carrier web 26 which minimizes the opportunities for premature setting of slurry 46 on the respective moving outer surfaces.

As the slurry 46 on the outer surface 62 of the main metering roll 48 moves toward the carrier web 26, the above-described spring biased doctor blade 134 is provided which separates the slurry 46 from the main metering roll 48 and deposits the slurry 46 onto the moving web 26. The doctor blade 134 provides the slurry 46 with a direct path down to within about 1.5 inches of the carrier web 26, allowing an unbroken curtain of slurry to be continuously deposited onto the web or forming line, which is important to producing homogeneous panels. Additional details of the gate 132 and the doctor blade 134 are provided in commonly assigned copending U.S. patent application Ser. No. 11/555,647, filed Nov. 1, 2006, and entitled PROCESS AND APPARATUS FOR FEEDING CEMENTITIOUS SLURRY FOR FIBER-REINFORCED STRUCTURAL CEMENT PANELS, which is incorporated by reference.

A second chopper station or apparatus 66, preferably identical to the chopper 36, is disposed downstream of the feeder 44 to deposit a second layer of fibers 68 upon the slurry 46. The chopper apparatus 66 may be fed cords 34 from the same rack 31 that feeds the chopper 36. However, it is contemplated that separate racks 31 could be supplied to each individual chopper.

Referring again to FIG. 6, next, an embedment device, generally designated 136, is disposed in operational relationship to the slurry 46 and the moving carrier 14 of the production line 130 to embed the first and second layers of fibers 30, 68 into the slurry 46. While a variety of embedment devices are contemplated, including, but not limited to vibrators, sheep's foot rollers and the like, in the preferred embodiment, the embedment device 136 is similar to the embedment device 70 with the exception that the overlap of the adjacent shafts 138 have been decreased to the range of approximately 0.5 inch. Also, the number of disks 140 has been reduced, and the disks are substantially thicker. In addition, there is a tighter spacing or clearance between adjacent overlapping disks 140 of adjacent shafts 138, on the order of 0.010 to 0.018 inches, to prevent fibers from becoming lodged between adjacent disks.

Further details of the embedment device 136 are found in copending, commonly assigned U.S. patent application Ser. No. 11/591,793, entitled EMBEDMENT ROLL DEVICE, filed Nov. 1, 2006, which is incorporated by reference. Otherwise, the embedment device 136 provides the same sort of kneading action as the device 70, with the objective of embedding or thoroughly mixing the fibers 30, 68 within the slurry 46.

If desired to further enhance the embedment of the fibers 30, 68 into the slurry 46, at each embedment device 136 the frame 12 is provided with at least one vibrator 141 in operational proximity to the carrier web 14 or the paper web 26 to vibrate the slurry 46. Such vibration has been found to more uniformly distribute the chopped fibers 30, 68 throughout the slurry 46. Conventional vibrator devices are deemed suitable for this use.

As seen in FIG. 6, to implement the present system 130 of multiple layers of fibers 30, 68 for each layer of slurry 46, additional chopping stations 142 are provided between the embedment device 136 and subsequent slurry feeder boxes 78, so that for each layer of slurry 46, fibers 30, 68 are deposited before and after deposition of the slurry. This improvement has been found to enable the introduction of significantly more fibers into the slurry and accordingly increase the strength of the resulting SCP panel. In the preferred embodiment, while only three are shown, four total layers of combined slurry and fiber are provided to form the SCP panel 92.

Upon the disposition of the four layers of fiber-embedded settable slurry as described above, a forming device such as the smoothing device, or vibrating shroud, 144 is preferably provided to the frame 12 to shape or smooth an upper surface 96 of the panel 92. By applying vibration to the slurry 46, the smoothing device 144 facilitates the distribution of the fibers 30, 68 throughout the panel 92, and provides a more uniform upper surface 96. The smoothing device 144 includes a mounting stand 146, a flexible sheet 148 secured to the mounting stand, a stiffening member 149 extending the width of the sheet 148 and a vibration generator 150 preferably located on the stiffening member to cause the sheet to vibrate.

As mentioned above, an important feature of the present invention is that the panel 92 has multiple layers 77, 80, 88, 90 which upon setting, form an integral, fiber-reinforced mass. Provided that the presence and placement of fibers in each layer are controlled by and maintained within certain desired parameters as is disclosed and described below, it will be virtually impossible to delaminate the panel 92 produced by the present process.

Utilizing two discrete layers of reinforcing fibers with each individual discrete slurry layer provides the following benefits. First, splitting the total amount of fibers to be incorporated in the slurry layer into two or more discrete fiber layers reduces the respective amount of fibers in each discrete fiber layer. Reduction in the amount of fibers in the individual discrete fiber layer enhances efficiency of embedment of fibers into the slurry layer. Improved fiber embedment efficiency in turn results in superior interfacial bond and mechanical interaction between the fibers and the cementitious matrix.

Next, a greater amount of reinforcing fibers can be incorporated into each slurry layer by utilizing multiple discrete layers of reinforcing fibers. This is due to the finding that the ease of embedment of the fibers into the slurry layer has been found to depend upon the total surface area of the fibers in the discrete fiber layer. Embedment of the fibers in the slurry layer becomes increasingly difficult as the amount of fibers in the discrete fiber layer increases, causing an increase in the surface area of the fibers to be embedded in the slurry layer. It has been found that when the total surface area of the fibers in the discrete fiber layer reaches a critical value, embedment of the fibers into the slurry layers becomes almost impossible. This imposes an upper limit on the amount of fibers that can successfully be incorporated in the discrete layer of slurry. For a given total amount of fibers to be incorporated in the discrete slurry layer, use of multiple discrete fiber layers reduces the total surface area of the fibers in each discrete fiber layer. This reduction in the fiber surface area (brought about by the use of multiple discrete fiber layers) in turn provides an opportunity to increase the total amount of fibers that can successfully be embedded into the discrete layer of slurry.

In addition, the use of multiple discrete fiber layers allows tremendous flexibility with respect to the distribution of fibers through the panel thickness. The amount of fibers in the individual discrete fiber layers may be varied to achieve desired objectives. The resulting creation of a "sandwich" construction is greatly facilitated with the presence of a larger number of discrete fiber layers. Panel configurations with fiber layers having higher amount of fibers near the panel skins and lower amount of fibers in the fiber layers near the panel core are particularly preferred from both product strength and cost optimization perspectives.

In quantitative terms, the influence of the number of fiber and slurry layers, the volume fraction of fibers in the panel, and the thickness of each slurry layer, and fiber strand diameter on fiber embedment efficiency has been investigated and established as part of the present system 130. A mathematical treatment for the concept of projected fiber surface area fraction for the case involving two discrete fiber layers and one discrete slurry layer is introduced and derived below. It has been found that it is virtually impossible to embed fibers in the slurry layer if the projected fiber surface area fraction of the discrete fiber layer exceeds a value of 1.0. Although the fibers may be embedded when the projected fiber surface area fraction falls below 1.0, the best results are obtained when the projected fiber surface area fraction is less than 0.65. When the projected fiber surface area fraction ranges between 0.65 and 1.00, the efficiency and ease of fiber embedment varies with best fiber embedment at 0.65 and worst at 1.00. Another way of considering this fraction is that approximately 65% of a surface of the slurry is covered by fibers.

Let,
$v_t$=Total volume of a fundamental fiber-slurry layer
$v_{f,l}$=Total fiber volume/layer
$v_{f1}$=Volume of fiber in discrete fiber layer 1 of a fundamental fiber-slurry layer
$v_{f2}$=Volume of fiber in discrete fiber layer 2 of a fundamental fiber-slurry layer
$v_{s,l}$=Volume of slurry in a fundamental fiber-slurry layer
$V_{f,l}$=Total volume fraction of fibers in a fundamental fiber-slurry layer
$d_f$=Diameter of individual fiber strand
$l_f$=Length of individual fiber strand
$t_l$=Total thickness of individual layer including slurry and fibers
$t_{s,l}$=Slurry layer thickness in a fundamental fiber-slurry layer
$X_f$=Ratio of layer 2 fiber volume to layer 1 fiber volume of a fundamental fiber-slurry layer
$n_{f,l}, n_{f1,l}, n_{f2,l}$=Total number of fibers in a fiber layer
$s_{f,l}^P, s_{f1,l}^P, s_{f2,l}^P$=Total projected surface area of fibers contained in a fiber layer
$S_{f,l}^P, S_{f1,l}^P, S_{f2,l}^P$=Projected fiber surface area fraction for a fiber layer To determine the projected fiber surface area fraction for a fiber layer in an arrangement of a fiber layer/slurry layer/fiber layer sandwich composed of one discrete slurry layer and two discrete fiber layers, the following relationship is derived.

Let,
The volume of the slurry layer be equal to $v_{s,l}$
The volume of the fibers in the layer 1 be equal to $v_{f1}$
The volume of the fibers in the layer 2 be equal to $v_{f2}$
The total volume fraction of fibers in the fundamental fiber-slurry layer be equal to $V_{f,l}$
The total thickness of the fundamental fiber-slurry layer be equal to $t_l$
The thickness of the slurry layer be equal to $t_{s,l}$
Let,
The total volume of fibers (i.e., fibers in layer 1 and layer 2) be equal to $v_{f,l}$:

$$v_{f,l} = v_{f1} + v_{f2} \quad (1)$$

and, $$\frac{v_{f2}}{v_{f1}} = X_f \quad (2)$$

Let,
The total volume of the fundamental fiber-slurry layer, $v_t$=
Total volume of slurry layer+Total volume of the two fiber layers=

$$v_{s,l} + v_{f,l} = v_{s,l} + v_{f1} + v_{f2} \quad (3)$$

Combining (1) and (2):

$$v_{f1} = \frac{v_{f,l}}{(1 + X_f)} \quad (4)$$

The total fiber volume of the fundamental fiber-slurry layer in terms of the total fiber volume fraction can be written as:

$$v_{f,l} = v_t * V_{f,l} \quad (5)$$

Thus, the volume of fibers in the layer 1 can be written as:

$$v_{f1} = \frac{v_t V_{f,l}}{(1 + X_f)} \quad (6)$$

Similarly, the volume of fibers in the layer 2 can be written as:

$$v_{f2} = \frac{X_f v_t V_{f,l}}{(1 + X_f)} \quad (7)$$

Assuming fibers to have cylindrical shape, the total number of fibers in the layer 1, $n_{f1,l}$ can be derived from Equation 8 as follows:

$$n_{f1,l} = \frac{4 v_t V_{f,l}}{\pi (1 + X_f) d_f^2 l_f} \quad (8)$$

where, $d_f$ is the fiber strand diameter and $l_f$ is the fiber strand length

Similarly, the total number of fibers in the layer 2, $n_{f2,l}$ can be derived from Equation 9 as follows:

$$n_{f2,l} = \frac{4 X_f v_t V_{f,l}}{\pi (1 + X_f) d_f^2 l_f} \quad (9)$$

The projected surface area of a cylindrical fiber is equal to the product of its length and diameter. Therefore, the total projected surface area of all fibers in layer 1, $s_{f1,l}^P$ can be derived as:

$$s_{f1,l}^P = n_{f1,l} * d_f * l_f = \frac{4 v_t V_{f,l}}{\pi (1 + X_f) d_f} \quad (10)$$

Similarly, the total projected surface area of fibers in layer 2, $s_{f2,l}^P$ can be derived as:

$$s_{f2,l}^P = n_{f2,l} * d_f * l_f = \frac{4 X_f v_t V_{f,l}}{\pi (1 + X_f) d_f} \quad (11)$$

The projected surface area of slurry layer, $s_{f2,l}^P$ can be written as:

$$s_{f2,l}^P = \frac{v_{s,l}}{t_{s,l}} = \frac{v_t}{t_l} \quad (12)$$

Projected fiber surface area fraction of fiber layer 1, $S_{f1,l}^P$ is defined as follows:

$$S_{f1,l}^P = \frac{\text{Projected surface area of all fibers in layer 1, } s_{f1,l}^P}{\text{Projected surface area of the slurry layer 1, } s_{s,l}^P} \quad (13)$$

Combining Equations 10 and 12, the projected fiber surface area fraction of fiber layer 1, $S_{f1,l}^P$ can be derived as:

$$S_{f1,l}^P = \frac{4 V_{f,l} t_l}{\pi (1 + X_f) d_f} \quad (14)$$

Similarly, combining Equations 11 and 12, the projected fiber surface area fraction of fiber layer 2, $S_{f2,l}^P$ can be derived as:

$$S_{f2,l}^P = \frac{4 X_f V_{f,l} t_l}{\pi (1 + X_f) d_f} \quad (15)$$

Equations 14 and 15 depict dependence of the parameter projected fiber surface area fraction, $S_{f1,l}^P$ and $S_{f2,l}^P$ on several other variables in addition to the variable total fiber volume fraction, $V_{f,l}$. These variables are diameter of fiber strand, thickness of discrete slurry layer, and the amount (proportion) of fibers in the individual discrete fiber layers.

Experimental observations confirm that the embedment efficiency of a layer of fiber network laid over a cementitious slurry layer is a function of the parameter "projected fiber surface area fraction". It has been found that the smaller the projected fiber surface area fraction, the easier it is to embed the fiber layer into the slurry layer. The reason for good fiber embedment efficiency can be explained by the fact that the extent of open area or porosity in a layer of fiber network increases with decreases in the projected fiber surface area fraction. With more open area available, the slurry penetration through the layer of fiber network is augmented, which translates into enhanced fiber embedment efficiency.

Accordingly, to achieve good fiber embedment efficiency, the objective function becomes keeping the fiber surface area fraction below a certain critical value. It is noteworthy that by varying one or more variables appearing in the Equation 15, the projected fiber surface area fraction can be tailored to achieve good fiber embedment efficiency.

Different variables that affect the magnitude of projected fiber surface area fraction are identified and approaches have been suggested to tailor the magnitude of "projected fiber surface area fraction" to achieve good fiber embedment efficiency. These approaches involve varying one or more of the following variables to keep projected fiber surface area fraction below a critical threshold value: number of distinct fiber and slurry layers, thickness of distinct slurry layers and diameter of fiber strand.

Based on this fundamental work, the preferred magnitudes of the projected fiber surface area fraction $S_{f1,l}^P$ have been discovered to be as follows:

Preferred projected fiber surface area fraction, $S_{f1,l}^P < 0.65$

Most preferred projected fiber surface area fraction, $S_{f1,l}^P < 0.45$

For a design panel fiber volume fraction, $V_f$, for example a percentage fiber volume content in each slurry layer of 1-5%, achievement of the aforementioned preferred magnitudes of projected fiber surface area fraction can be made possible by tailoring one or more of the following variables—total number of distinct fiber layers, thickness of distinct slurry layers and fiber strand diameter. In particular, the desirable ranges for these variables that lead to the preferred magnitudes of projected fiber surface area fraction are as follows:

Thickness of Distinct Slurry Layers, $t_{s,l}$

Preferred thickness of distinct slurry layers, $t_{s,l} \leq 0.35$ inches

More Preferred thickness of distinct slurry layers, $t_{s,l} \leq 0.25$ inches

Most preferred thickness of distinct slurry layers, $t_{s,l} \leq 0.15$ inches

Fiber Strand Diameter, $d_f$

Preferred fiber strand diameter, $d_f \geq 30$ tex

Most preferred fiber strand diameter, $d_f \geq 70$ tex

EXAMPLES

Example 1

Referring now to FIG. 1C, a fragment of the SCP panel 92 made from fibers and a slurry. The cements portion of the slurry comprises 65 wt. % Calcium sulfate alpha hemihydrate, 22 wt. % Type III Portland cement, 12 wt. % Silica Fume, and 1 wt. % hydrated lime. The liquid portion of the slurry comprises 99.19 wt. % water and 0.81 wt. % ADVACAST superplasticizer by W.R. Grace and Co. The liquid:cement weight ratio was 0.55 and the Aggregate (EXTENDOSPHERES SG microspheres):Cement weight ratio was 0.445.

The slurry was produced according to the present process, using the present system, and is shown to have four slurry layers, 77, 80, 88 and 90. This panel should be considered exemplary only in that a panel 92 produced under the present system may have one or more layers. By using the above mathematical relationships, the slurry layers 77, 80, 88 and 90 can have different fiber volume fractions. For example, skin or face layers 77, 90 have a designated fiber volume fraction $V_f$ of 5%, while inner layers 80, 88 have a designated $V_f$ of 2%. This provides a panel with enhanced outer strength, and an inner core with comparatively less strength, which may be desirable in certain applications, or to conserve fibers for cost reasons. It is contemplated that the fiber volume fraction $V_f$ may vary among the layers 77, 80, 88, 90 to suit the application, as can the number of layers.

Also, modifications of the fiber content can be accomplished within each slurry layer. For example, with a fiber volume fraction $V_f$ of 5%, for example, fiber layer 1 optionally has a designated slurry volume fraction of 3% and fiber layer 2 optionally has a designated fiber volume fraction of 2%. Thus, $X_f$ will be 3/2.

Referring now to Table 1, panels were manufactured using the system of FIG. 6 and using the above-described projected fiber surface area fraction formula from the above-described slurry composition. Panel thickness ranged from 0.5 to 0.82 inches. Individual slurry layer thicknesses ranged from 0.125 to 0.205. Total fiber volume fraction $V_f$ ranged from 2.75-4.05%. In Panel 1, as described above in relation to FIG. 1C, the outer fiber layers 1 and 8 had relatively higher volume fraction (%) as a function of total panel volume 0.75% v. 0.43% for inner layers, and the projected fiber surface area fraction ranged from 0.63% on the outer layers 1 and 8 and 0.36 on the inner layers 2 through 7. In contrast, panel 4 had the same volume fraction % of 0.50 for all fiber layers, and a similarly constant projected fiber surface area fraction of 0.42% for all fiber layers. It was found that all of the test panels had excellent fiber embedment. Interestingly, panel 1, had only a slightly lower flexural strength than panel 4, respectively 3401/3634 psi.

In the present system 130, by increasing the number of fiber layers, each with its own fiber surface area fraction, more fibers can be added to each slurry layer without requiring as many layers of slurry. Using the above process, the panel 92 can have the same thickness as prior panels, with the same number of fibers of the same diameter, with fewer number of slurry layers. Thus, the resulting panel 92 has layers of enhanced strength but is less expensive to produce, due to a shorter production line using less energy and capital equipment.

TABLE 1

Mechanical properties of the panels of invention

| Panel ID | | 1 | 2 | 3 | 4 | 5 | 6 | 7 |
|---|---|---|---|---|---|---|---|---|
| # of slurry layers | | 4 | 4 | 4 | 4 | 4 | 4 | 4 |
| # of fiber layers | | 8 | 8 | 8 | 8 | 8 | 8 | 8 |
| Design panel thickness (inches) | | 0.50 | 0.50 | 0.50 | 0.50 | 0.75 | 0.75 | 0.82 |
| Design layer thickness (inches) | | 0.125 | 0.125 | 0.125 | 0.125 | 0.188 | 0.188 | 0.205 |
| Total fiber volume fraction (%) | | 4.05 | 3.53 | 3.00 | 4.00 | 2.50 | 3.00 | 2.75 |
| Volume fraction (%) of individual fiber layers as a function of total panel volume | Fiber layer 1 | 0.75 | 0.75 | 0.75 | 0.50 | 0.31 | 0.38 | 0.38 |
| | Fiber layer 2 | 0.43 | 0.34 | 0.25 | 0.50 | 0.31 | 0.38 | 0.38 |
| | Fiber layer 3 | 0.43 | 0.34 | 0.25 | 0.50 | 0.31 | 0.38 | 0.25 |
| | Fiber layer 4 | 0.43 | 0.34 | 0.25 | 0.50 | 0.31 | 0.38 | 0.25 |
| | Fiber layer 5 | 0.43 | 0.34 | 0.25 | 0.50 | 0.31 | 0.38 | 0.38 |
| | Fiber layer 6 | 0.43 | 0.34 | 0.25 | 0.50 | 0.31 | 0.38 | 0.38 |
| | Fiber layer 7 | 0.43 | 0.34 | 0.25 | 0.50 | 0.31 | 0.38 | 0.53 |
| | Fiber layer 8 | 0.75 | 0.75 | 0.75 | 0.50 | 0.31 | 0.38 | 0.23 |
| Projected fiber surface area fraction of individual fiber layers | Fiber layer 1 | 0.63 | 0.63 | 0.63 | 0.42 | 0.40 | 0.47 | 0.52 |
| | Fiber layer 2 | 0.36 | 0.28 | 0.21 | 0.42 | 0.40 | 0.47 | 0.52 |
| | Fiber layer 3 | 0.36 | 0.28 | 0.21 | 0.42 | 0.40 | 0.47 | 0.35 |
| | Fiber layer 4 | 0.36 | 0.28 | 0.21 | 0.42 | 0.40 | 0.47 | 0.35 |
| | Fiber layer 5 | 0.36 | 0.28 | 0.21 | 0.42 | 0.40 | 0.47 | 0.52 |
| | Fiber layer 6 | 0.36 | 0.28 | 0.21 | 0.42 | 0.40 | 0.47 | 0.52 |
| | Fiber layer 7 | 0.36 | 0.28 | 0.21 | 0.42 | 0.40 | 0.47 | 0.72 |
| | Fiber layer 8 | 0.63 | 0.63 | 0.63 | 0.42 | 0.40 | 0.47 | 0.31 |
| 28-day flexural strength (psi) | Oven dry | 3401 | 3113 | 3119 | 3634 | — | — | — |
| | As is | — | — | — | — | 1858 | 2106 | 1875 |

Example 2

The residence time of the wet slurry in various embodiments of a vertical mixing chamber have been empirically determined by determining the residence time of a red dye tracer added to the slurry to completely exit the vertical chamber. Tests were conducted to determine residence time in the vertical mixing chambers using a red dye tracer added to the water and powder slurry as it enters the vertical chamber. The cementitious slurry had substantially the same composition as described above for Example 1.

The equipment used was a digital scale to weigh the slurry, a bucket to catch the slurry and a stop watch to measure the elapsed time of the various points. A mixer was used with three different mixing chamber designs as listed in Tables 2-4 as a 12 inch Mixer, an 8 inch Extended Mixer, and an 8 inch Stock Mixer.

The 8 inch Stock Mixer is a DUO MIX 2000 mixer which is similar to that of FIG. 3A of U.S. patent application Ser. No. 11/555,655, entitled APPARATUS AND METHOD FOR WET MIXING CEMENTITIOUS SLURRY FOR FIBER-REINFORCED STRUCTURAL CEMENT PANELS, filed Nov. 1, 2006, but at least differs by having a shorter vertical mixing chamber and a smaller working volume within which the slurry is mixed in the mixing chamber. The working volume is the portion of the mixer occupied by the slurry in normal operation.

The 8 inch Extended Mixer is disclosed in FIG. 3A of U.S. patent application Ser. No. 11/555,655, entitled APPARATUS AND METHOD FOR WET MIXING CEMENTITIOUS SLURRY FOR FIBER-REINFORCED STRUCTURAL CEMENT PANELS, filed Nov. 1, 2006. It differs from the 8 inch Stock Mixer at least because its vertical chamber was extended to provide a relatively larger working volume.

Figure 4:
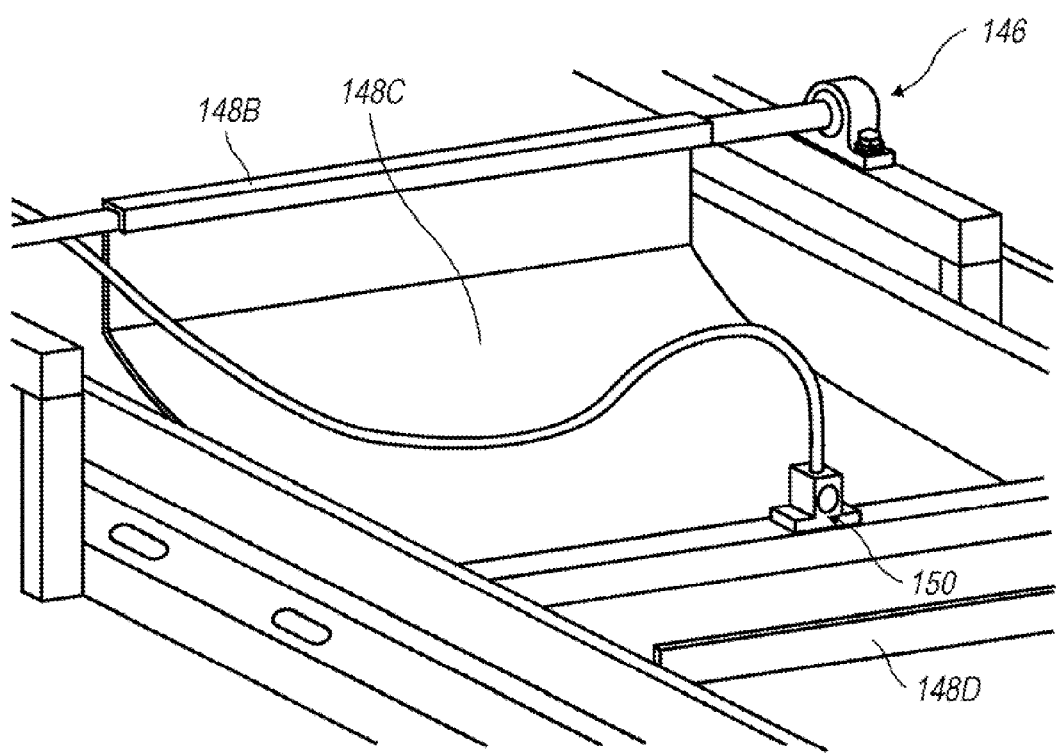
FIG. 4 shows the side view of the flexible smoothing device in its operational position over the direction of travel of the web carrying the slurry panel from the final forming station.
Figure 5:
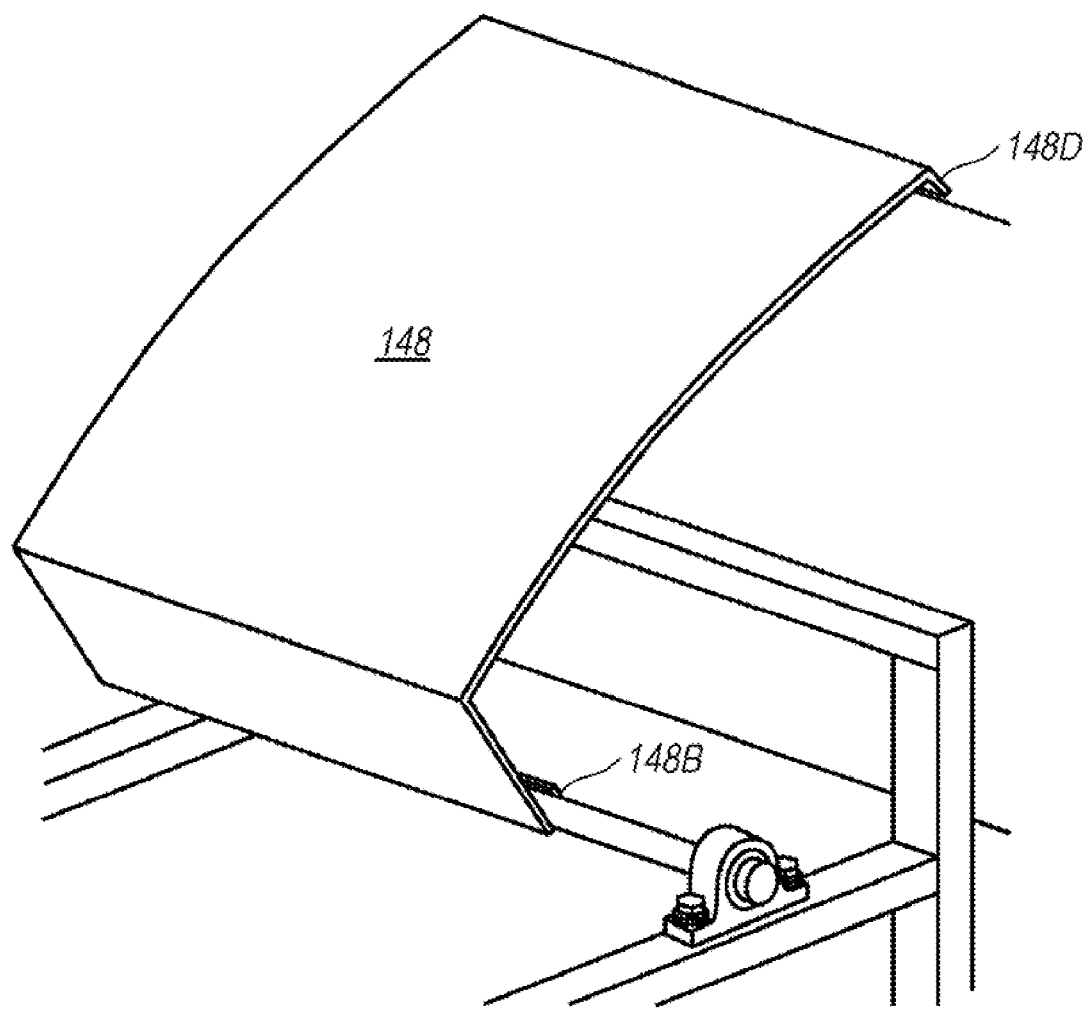
FIG. 5 shows the pivotally mounted flexible smoothing device in the upward position over the web line when it is not in use.

The 12 inch Mixer is disclosed in FIG. 4 of U.S. patent application Ser. No. 11/555,658, entitled APPARATUS AND METHOD FOR WET MIXING CEMENTITIOUS SLURRY FOR FIBER-REINFORCED STRUCTURAL CEMENT PANELS, filed Nov. 1, 2006. It shares some back end components with the 8 inch Stock Mixer but has a different vertical mixing chamber as well as other differences.

After achieving and maintaining a consistent slurry fluidity of 6-8 inches (15 to 20 cm) slump a liquid solution of common brick dye (tracer) was added to the vertical chamber at a set mixer output speed (say 60%, initially). Mixer output speed is directly related to paddle speed and pump speed. These mixers had a 1-10 speed controller. Basically setting of 1=about 45 RPM and a setting of 10=about 260 RPM.

The watch was started when the dye was added. The time that red-dyed slurry first exited the hose was at noted (T1). The time which the red dye no longer visibly stained the slurry was noted as well (T2). This process was repeated at the various pump output speeds and again with all the various mixer chamber designs. All time values were lowered by the amount of time required to pump the slurry through the specific length of hose at a given pump speed. This effectively eliminates the time the slurry takes to travel through the hose and allowed a more accurate comparison between the various chamber designs.

Slump was measured by pouring slurry into a 2 inch diameter cylinder that is 4" tall (open on each end and placed on end on a flat smooth surface) and screeding the top of the slurry off. This provides a set volume of slurry for every test. Then the cylinder was immediately lifted and the slurry rushed out the open bottom end of the cylinder. This act formed a circular "patty" of slurry. The diameter of this patty is measured in inches and recorded. A more fluid slurry will typically result in a larger diameter patty.

Table 2 displays the time elapsed from the addition of the dye ($T_0$) to the time the dye is first seen (T1) until the time the dye is no longer visible (T2). The time to first dye visible (T1) is subtracted from the time until dye no longer visible (T2) to obtain total residence time and these values are shown in Table 3. Table 4 lists average residence times (Time to Empty Vertical Chamber) of the runs of this example as calculated as slurry flow rate divided by Working Volume.

TABLE 2

| | Dye First Visible | | | | Dye No Longer Visible | | |
|---|---|---|---|---|---|---|---|
| Mixer Output Speed | 12 inch Mixer T1 (sec) | 8 inch Extended Mixer T1 (sec) | 8 inch Stock Mixer T1 (sec) | Mixer Output Speed | 12 inch Mixer T2 (sec) | 8 inch Extended Mixer T2 (sec) | 8 inch Stock Mixer T2 (sec) |
| 60% | 37.0 | 24.5 | 21.5 | 60% | 214.5 | 119.5 | 79.0 |
| 80% | 27.8 | 17.3 | 14.8 | 80% | 153.3 | 93.3 | 63.3 |
| 100% | 21.1 | 13.6 | 11.6 | 100% | 118.1 | 83.1 | 47.6 |

TABLE 3

| Total Residence Time ($\Delta T = T2 - T1$) | | | |
|---|---|---|---|
| Mixer Output Speed | 12 inch Mixer $\Delta T$ (sec) | 8 inch Extended Mixer $\Delta T$ (sec) | 8 inch Stock Mixer $\Delta T$ (sec) |
| 60% | 177.5 | 95.0 | 57.5 |
| 80% | 125.5 | 76.0 | 48.5 |
| 100% | 97.0 | 69.5 | 36.0 |

TABLE 4

| "Averaged" Delivery Rates based solely on Working Chamber Volume and Pump Rates | | | |
|---|---|---|---|
| Mixer | Working Slurry Volume (L) | Pump Rate @ 60% Output (L/min) | Time to Empty Vertical Chamber (sec) |
| 12" Mixer | 20.77 | 24.43 | 51.0 |
| 8" Extended Mixer | 10.49 | 24.43 | 25.8 |
| 8" Stock Mixer | 4.06 | 24.43 | 10.0 |
| Mixer | Working Slurry Volume (L) | Pump Rate @ 80% Output (L/min) | Time to Empty Vertical Chamber (sec) |
| 12" Mixer | 20.77 | 34.32 | 36.3 |
| 8" Extended Mixer | 10.49 | 34.32 | 18.3 |
| 8" Stock Mixer | 4.06 | 34.32 | 7.1 |

TABLE 4-continued

"Averaged" Delivery Rates based solely
on Working Chamber Volume and Pump Rates

| Mixer | Working Slurry Volume (L) | Pump Rate @ 100% Output (L/min) | Time to Empty Vertical Chamber (sec) |
|---|---|---|---|
| 12" Mixer | 20.77 | 46.08 | 27.0 |
| 8" Extended Mixer | 10.49 | 46.08 | 13.7 |
| 8" Stock Mixer | 4.06 | 46.08 | 5.3 |

In Tables 2 and 3 the inches represent the nominal OD of the mixing chambers. The 8 inch Stock Mixer is a comparative example. The overall length of the mixing chambers are as follows: 8 inch stock mixer: 17 inches tall, about 5 inch working height (depth of slurry); 8 inch Extended mixer: 25 inches tall about 14 inch working height (depth of slurry); 12 inch mixer: 25 inches tall, about 13 inches working height (depth of slurry).

The mixer output speed represents the speed of the mixer impeller and the rate material is flowing through the mixer because the same motor powers the impeller paddle and the discharge pump.

Comparing Total Residence Time of the 8 inch Extended Mixer or the 12 inch Mixer to the 8 inch Stock Mixer shows the significant increase in residence time found by increasing mixer volume (at any pump speed (60%, 80% or 100%)). Also, the Time to Dye First Visible shows a significant increase in the time elapsed from the time the dye (or slurry) enters the chamber until the dye (or slurry) first begins to exit the mixer. This helps ensure material does not enter the mixing chamber and then quickly exit without being adequately mixed.

Thus, increasing the volume of the chamber significantly increases the time cement slurry must remain in the chamber (undergoing mixing) before it can first exit the chamber. In addition, the amount of time elapsed before all the slurry that entered the chamber at a discrete point in time is emptied from the chamber is significantly increased with the larger volume mixers. These findings are supported by the increase in compressive strength noted when mixing time was increased.

Example 3

Figure 7:
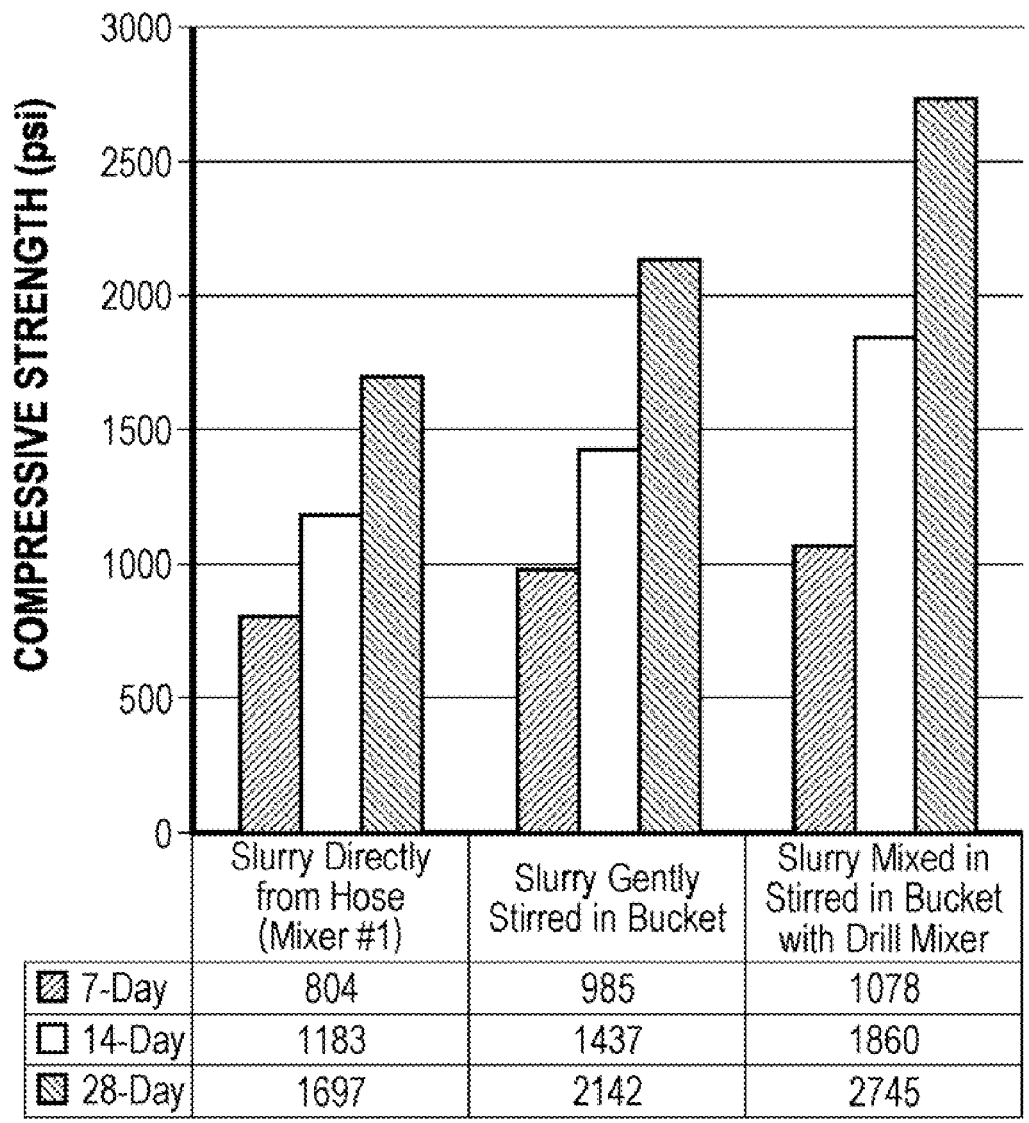
FIG. 7 is a plot of data from Example 3 of the present specification.

FIG. 7 presents data from a comparison of the product from the hose of a DUO MIX 2000 mixer ("Mixer #1") with the product from the hose of a DUO MIX mixer further mixed in a bucket ("Slurry Gently Stirred in Bucket") and the product from the hose of a DUO MIX mixer further mixed in a bucket with a drill mixer ("Slurry Mixed in Bucket with Drill Mixer"). The first mixer was not mixing the slurry completely enough. However, with the additional mixing a significant benefit was seen.

This example used the DUO MIX mixer, a hand stirrer (similar to a paint stick, a hand drill with a joint compound mixing paddle, a 5 gallon bucket and a stop watch. Cementitious slurry was collected from the discharge hose and compressive cubes were cast using method ASTM C109. The cementitious slurry had substantially the same composition as described above for Example 1.

In particular, slurry was taken directly from the output hose of the DUOMIX mixer. Compressive strength cubes were then made from the slurry using the above-mentioned method ASTM C109.

Immediately afterwards, cementitious slurry was again collected in a bucket and stirred by hand with a metal spatula for 1 minute. The slurry was then used to cast the compressive strength cubes using the above-mentioned method ASTM C109 and tested to determine compressive strength. In particular, cement slurry from the mixer hose was pumped into a 5 gallon bucket and this slurry was gently stirred with by hand with a paddle. Compressive strength cubes were then made from the slurry using the above-mentioned method ASTM C109.

Immediately after this, cement slurry was collected again and this time mixed for 1 minute in a bucket using a hand drill and a mixing paddle similar to that used to mix joint compound. In particular, cement slurry from the mixer hose was pumped into another 5 gallon bucket and this slurry was mixed with a drill equipped with a stirring device (the mixing paddle), similar to that used to mix joint compound. Compressive strength cubes were then made from the slurry using the above-mentioned method ASTM C109.

The cubes made from the slurry taken directly from the output hose of the DUOMIX mixer were tested for compressive strength at 7, 14 and 28 days after they were produced. The compressive strength results of each time period were averaged and reported in the table of FIG. 7 under "Slurry Directly From Hose (Mixer #1)".

The cubes made from the slurry that had been hand mixed were tested for compressive strength at 7, 14 and 28 days after they were produced. The compressive strength results of each time period were averaged and reported in the table of FIG. 7 under "Slurry Gently Stirred in Bucket".

The cubes made from the slurry that had been mixed with the drill mixer were tested for compressive strength at 7, 14 and 28 days after they were produced. The compressive strength results of each time period were averaged and reported in the table of FIG. 7 under "Slurry Mixed in Bucket with Drill Mixer".

The general conclusion from this investigation was that increasing the mixing energy and or the mixing time significantly improves development of material compressive strength, a key component of the panel's overall performance characteristics.

While a particular embodiment of the present slurry feed apparatus for fiber-reinforced structural cementitious panel production has been shown and described, it will be appreciated by those skilled in the art that changes and modifications may be made thereto without departing from the invention in its broader aspects and as set forth in the following claims.

What is claimed is:

1. A continuous method for smoothing the top surface of a formed, but not yet set, fiber reinforced gypsum-cementitious structural panel comprising slurry and embedded loose chopped fibers, in a structural panel production line comprising the steps of:
transporting the panel on a moving carrier having a direction of travel relative to a support frame,
pivotally mounting a vibrating smoothing device, comprising a flexible sheet with a stiffening member and a vibrator, transversely to the direction of travel of the panel;
contacting a downstream portion of a bottom surface of the sheet with a top surface of the panel while vibrating the sheet and spacing an upstream portion of the sheet from the top surface of the panel,
wherein the smoothing device floats over the surface of the panel to smooth the surface and eliminate pock marks and grooves without scraping off excess slurry of the chopped fiber reinforced panel, and without scratching or tearing the surface of the chopped fiber reinforced panel,
  wherein an upstream end of the flexible sheet is pivotally mounted to be freely pivotal while the downstream portion of the flexible sheet simultaneously floats as the downstream portion of the flexible sheet contacts the panel as the panel is transported on the moving carrier.

2. The method of claim 1, the smoothing device smoothing the top surface of a formed, but not yet set, fiber reinforced gypsum-cementitious structural panel comprising slurry and embedded chopped fibers, in the structural panel production line, wherein the panel is transported on a moving carrier having a direction of travel relative to a support frame, the device comprising:
  the flexible sheet having an upstream portion having an upstream end, and a downstream portion having a downstream end, wherein the upstream end of the sheet is pivotally mounted to the side dams of a slurry panel forming line,
  the stiffening member mounted on the surface of the downstream portion of the flexible sheet opposite the surface to be in contact with the panel;
  a pivotal mounting station for the pivotally mounting of the flexible sheet on a transverse member transversely to the direction of travel of the panel to allow the flexible sheet to float over the entire width of the top surface of the panel at the flexible sheet point of contact with the panel, and
  the vibrator attached to the stiffening member,
  wherein the flexible sheet has a curved wall having a curved profile for spacing an upstream end of the curved wall from the panel while contacting the downstream portion of the curved wall with the panel,
  wherein the portion of the flexible sheet of the smoothing device in contact with the surface of the formed layer is the downstream about 12 to about 16 inches of the flexible sheet,
  wherein the curved wall forms an angle of less than 15° with the upper surface of the panel on the upstream side of a nip formed by the curved wall and panel; and
  the pivotal mounting station mounting the sheet to be freely pivotal at the upstream end on the transverse member while simultaneously the downstream end contacting the panel is free floating.

3. The method of claim 2, wherein the vibrator is attached to a source of supply of air to vibrate the stiffening member and the upstream end of the flexible sheet is pivotally in contact with the transverse member along the entire transverse width of the flexible sheet.

4. The method of claim 1, further comprising weights on each side of the flexible sheet surface opposite the surface that contacts the slurry for holding the edges of the sheet from moving upward.

5. The method of claim 1, wherein the stiffening member is mounted about 6 to about 8 inches from a trailing downstream edge of the flexible sheet.

6. The method of claim 1, wherein the flexible sheet is about 2 to 4 feet in length and the width is about the same width as the panel.

7. The method of claim 6, wherein the width of the flexible sheet is about 40 to 60 inches.

8. The method of claim 1, comprising pivoting the flexible sheet up and away from the production line when it is not in use.

9. The method of claim 1, wherein the flexible sheet has a curved wall for contacting the panel, a first upstanding wall extending upwards from an upstream edge of the curved wall, and a second upstanding wall extending upwards from a downstream edge of the curved wall, wherein the curved wall forms an angle of less than 5° with the upper surface of the panel on the upstream side of a nip formed by the curved wall and panel; and
  the flexible sheet pivotally mounted on a transverse support bar, wherein a U-shaped upper end portion of the first upstanding wall hooked over the transverse support bar pivotally mounts the flexible sheet upstream end while the flexible sheet downstream portion floats over the entire width of the top surface of the panel at the flexible sheet point of contact with the panel.

10. The method of claim 1, wherein the vibrating smoothing device further embeds the fiber into the formed structured cement panel.

11. The method of claim 1, further comprising discharging the panel from a fiber embedding station of the production line and feeding the panel discharged from the fiber embedding station to the vibrating smoothing device.

12. The method of claim 1, further comprising passing the panel through at least two fiber embedding stations of the production line for embedding the loose fibers and feeding the panel discharged from the most downstream fiber embedding station to the vibrating smoothing device.

13. The method of claim 1, wherein the flexible sheet of the smoothing device is disposed over the entire width of the formed panel.

14. The method of claim 1, wherein the portion of the flexible sheet of the smoothing device in contact with the surface of the formed layer is about 12 to about 16 inches.

15. The method of claim 1, wherein the pressure exerted by the smoothing device apparatus over the area of the panel is about 0.05 to about 0.5 psi.

16. The method of claim 1, wherein the pressure is about 0.05 to 0.15 pounds per square inch.

17. The method of claim 1, wherein the formed slurry is in contact with the flexible sheet for about 2 to about 10 seconds.

18. The method of claim 1, wherein the flexible sheet has a curved wall for contacting the panel, a first upstanding wall extending upwards from an upstream edge of the curved wall, and a second upstanding wall extending upwards from a downstream edge of the curved wall, wherein the curved wall forms an angle of less than 15° with the upper surface of the panel on the upstream side of a nip formed by the curved wall and panel.

19. The method of claim 18, wherein the formed slurry contacts the flexible sheet for about 5 to 8 seconds and the curved wall tapers from forming the angle of less than 15° with the upper surface of the panel on the upstream side of the nip formed by the curved wall and panel to forming an angle of about 0° with the upper surface of the panel at a downstream end of the flexible sheet.

20. The method of claim 1, further comprising:
  transporting a slurry on a moving carrier relative to a support frame,
  deposited chopped fibers upon the slurry,
  embedding the fibers in the slurry to form the formed, but not yet set, structural cement panel by passing the slurry with the deposited fibers through an embedment device for use in a structural panel production line to contact a first plurality of axially spaced disks axially fixed to a first integrally formed elongate shaft rotatably secured to the support frame and contact a second plurality of axially spaced disks axially fixed to a second integrally formed elongate shaft rotatably secured to the support frame;

said first shaft being disposed relative to said second shaft to be horizontally aligned and so that said disks intermesh with each other, and wherein, when viewed from the side, peripheries of said first and second pluralities of disks overlap each other;

wherein the formed, but not yet set, panel passes underneath the pivotally mounted vibrating smoothing device and contacts the downstream portion of the bottom surface of the sheet with the top surface of the panel while the sheet is vibrated and the upstream portion of the sheet is spaced from the top surface of the panel.

* * * * *